Oct. 30, 1956 E. L. CLINE 2,768,711
HYDRO-KINETIC APPARATUS
Filed Oct. 12, 1951. 12 Sheets-Sheet 1

INVENTOR
Edwin L. Cline
BY Bacon + Thomas
ATTORNEYS

Oct. 30, 1956 E. L. CLINE 2,768,711
HYDRO-KINETIC APPARATUS
Filed Oct. 12, 1951 12 Sheets-Sheet 2
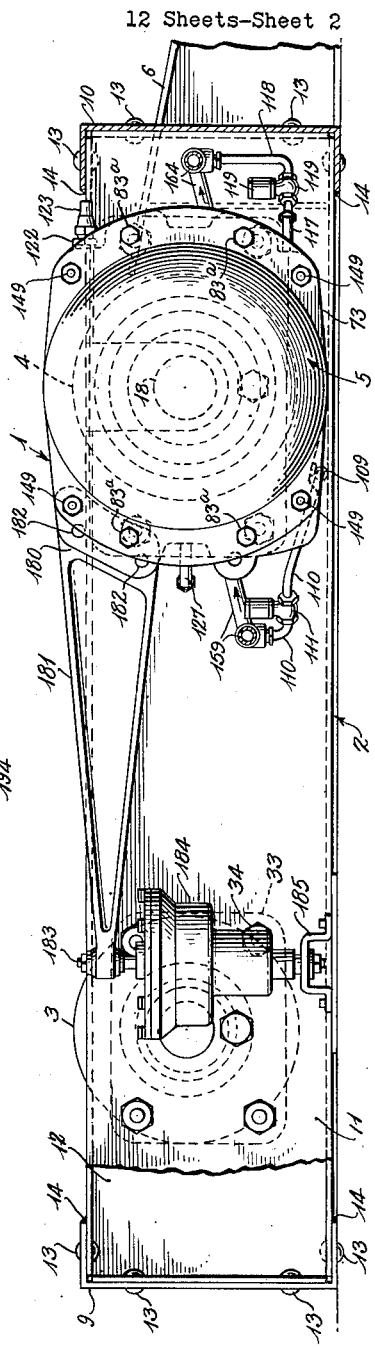
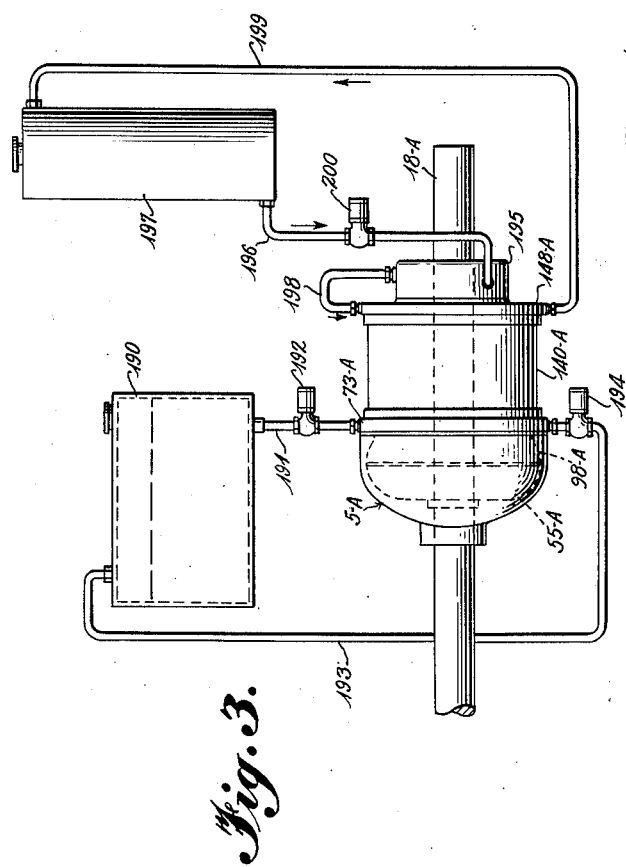
INVENTOR.
*Edwin L. Cline*
BY
*Baron + Thomas*
ATTORNEYS

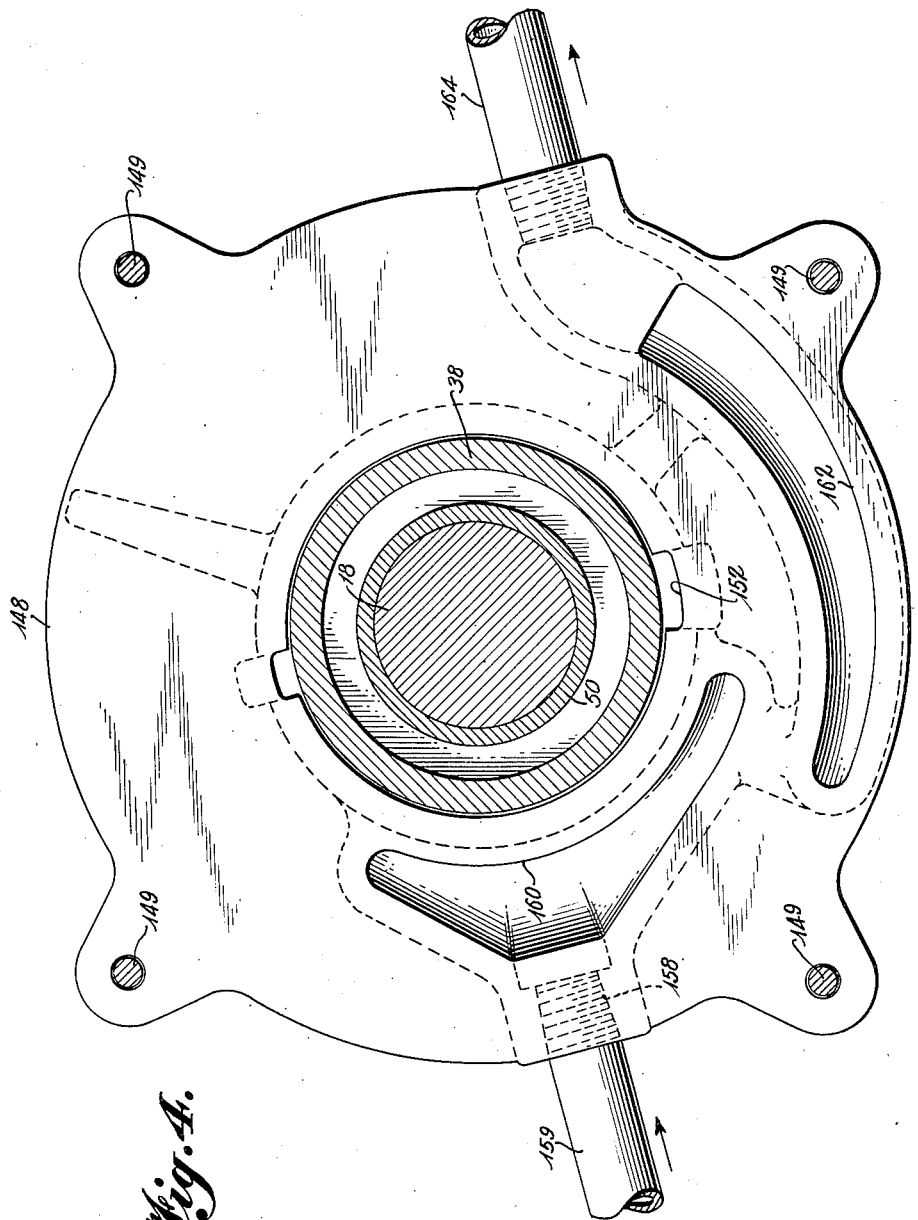

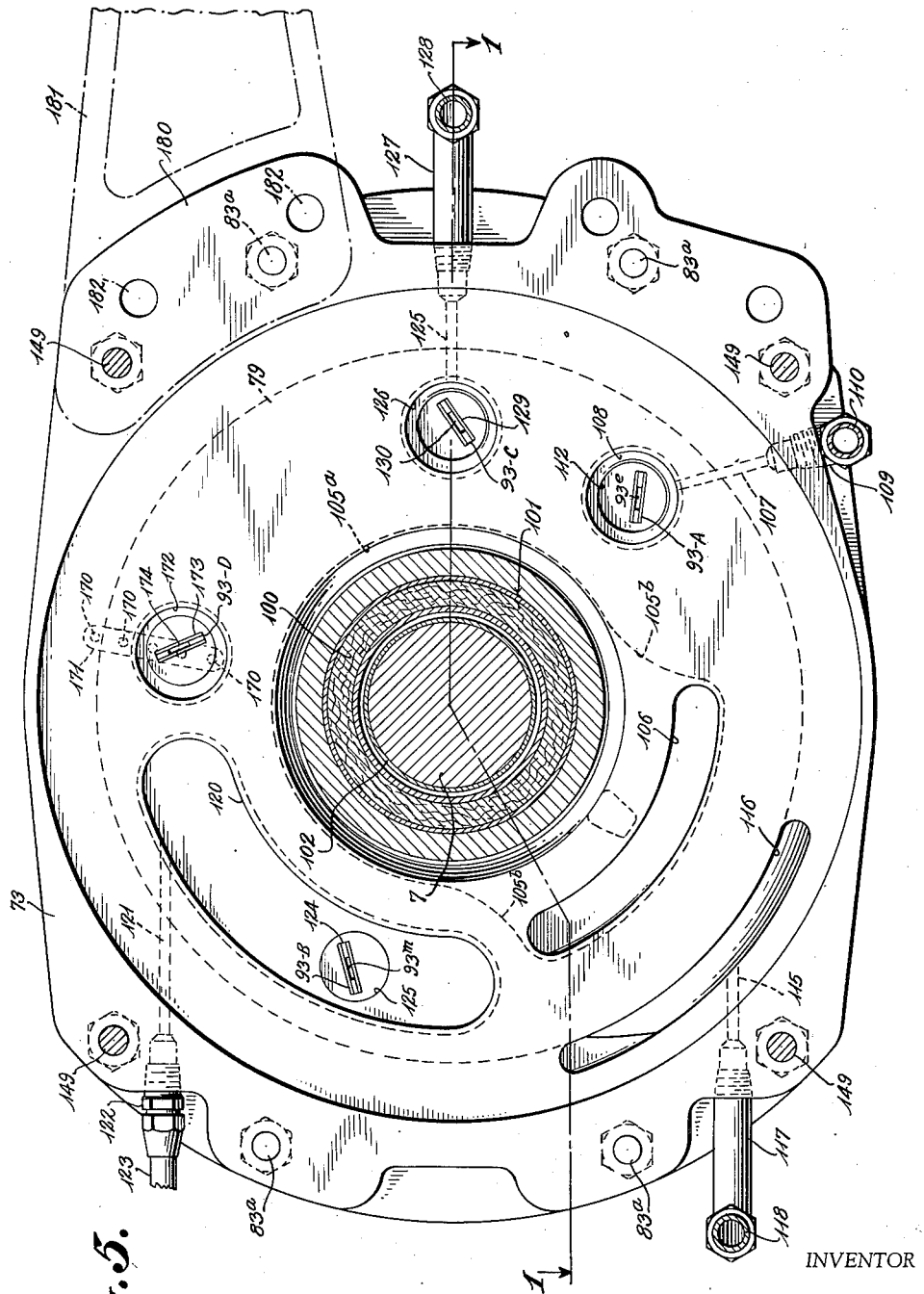

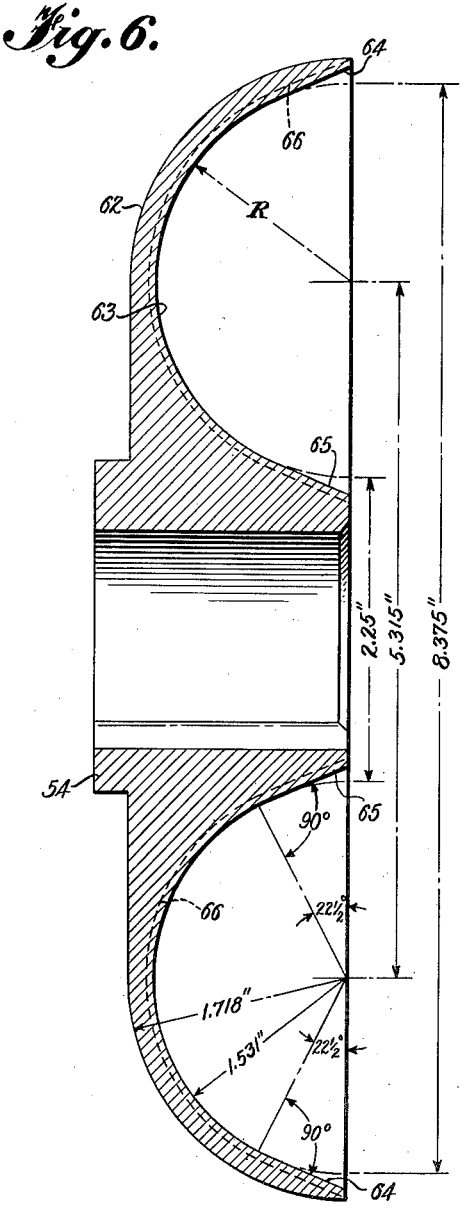

INVENTOR
Edwin L. Cline
BY Bacon & Thomas
ATTORNEYS

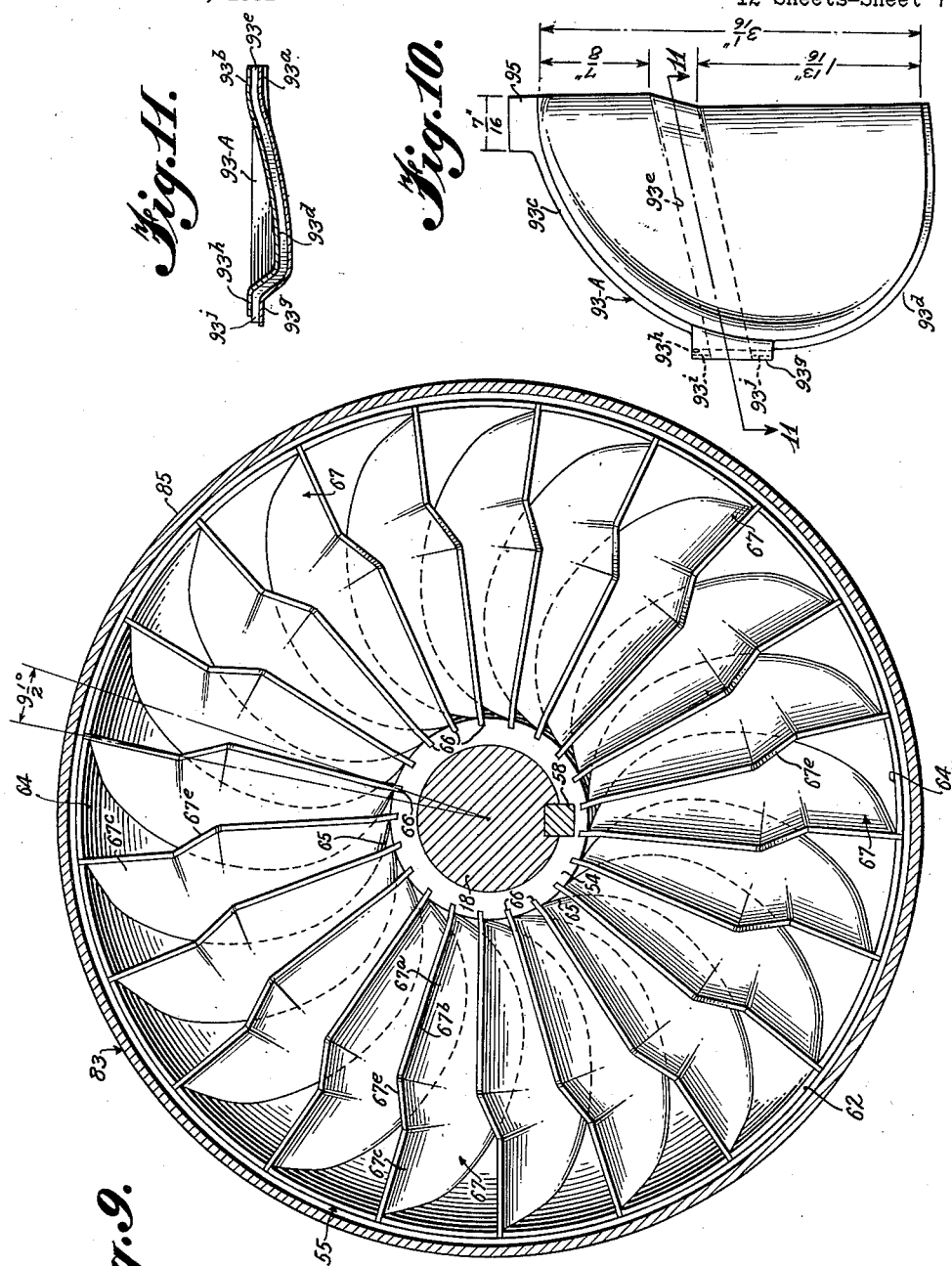

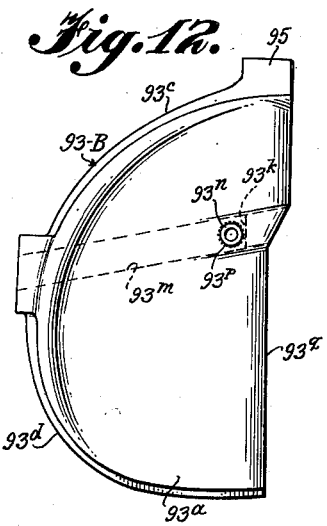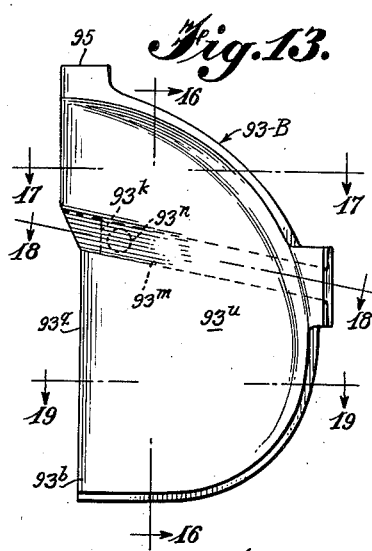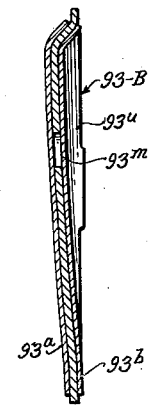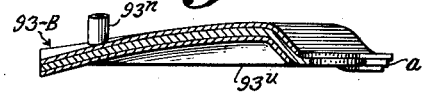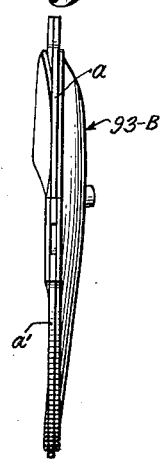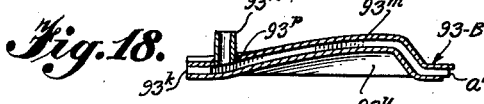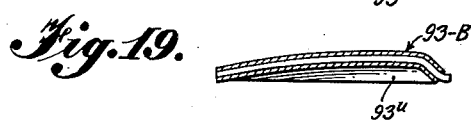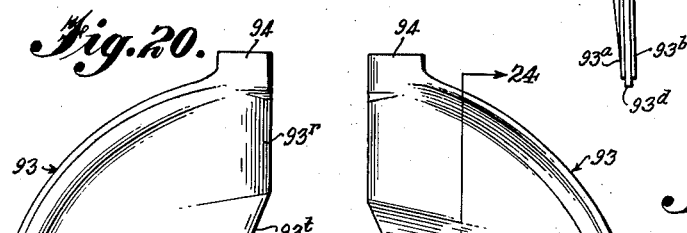

Oct. 30, 1956  E. L. CLINE  2,768,711
HYDRO-KINETIC APPARATUS
Filed Oct. 12, 1951  12 Sheets-Sheet 9
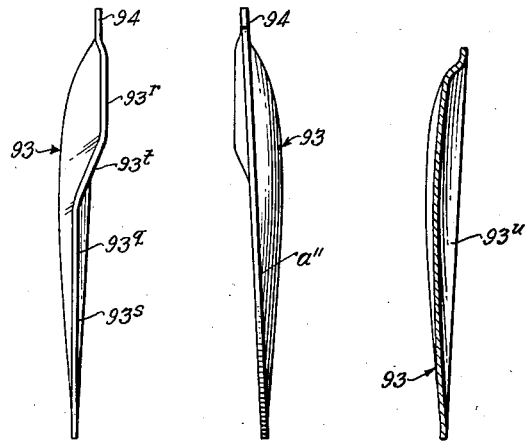
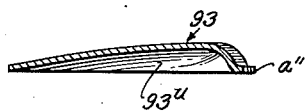
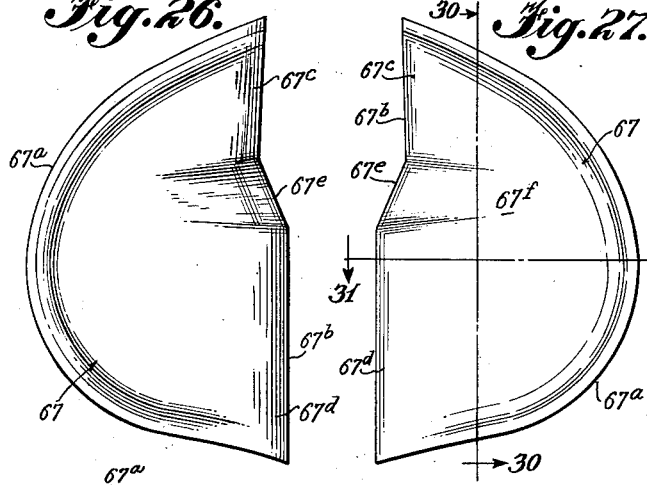
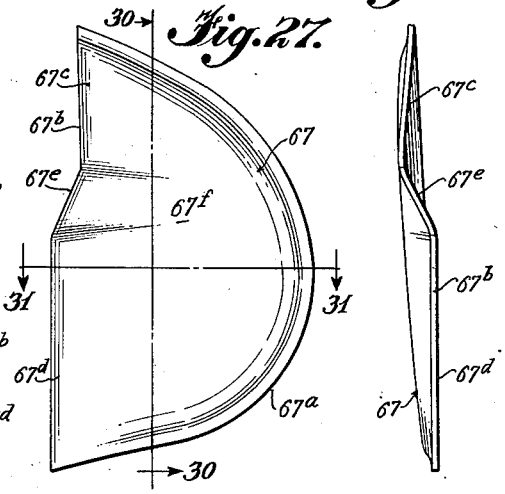
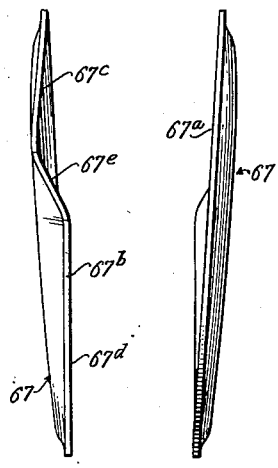
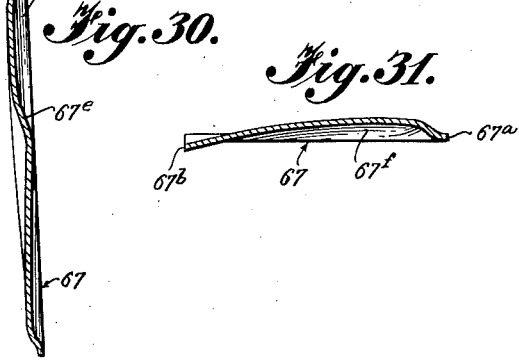
INVENTOR.
BY Edwin L. Cline
Bacon & Thomas
ATTORNEYS

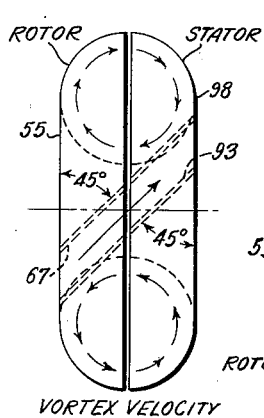
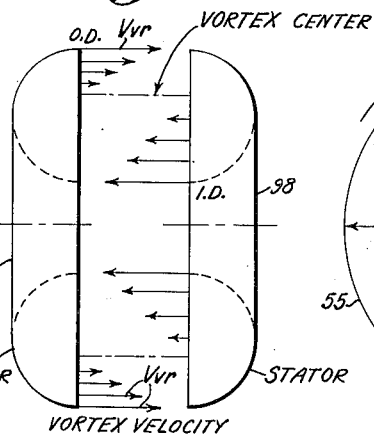
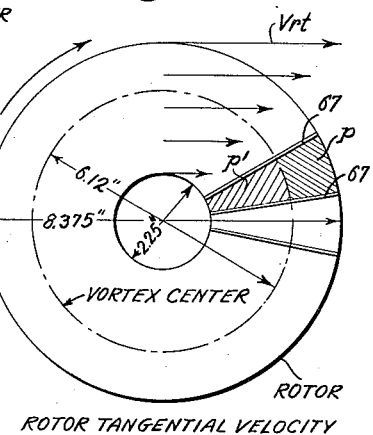
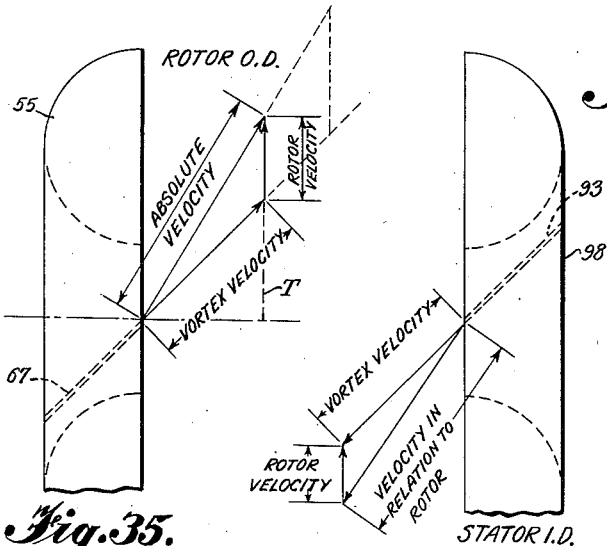
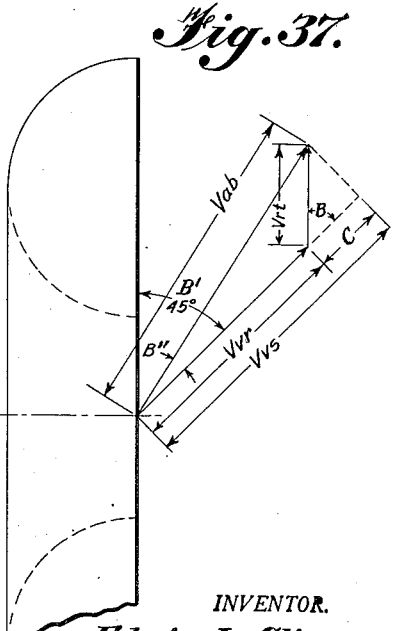
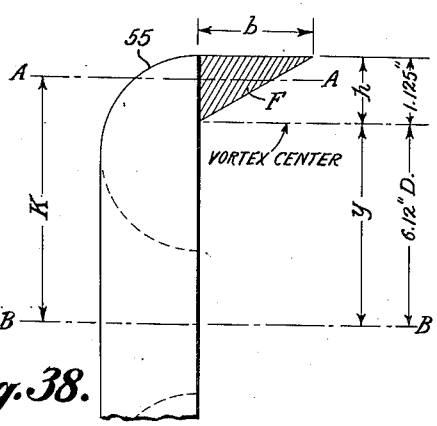

INVENTOR.
Edwin L. Cline
BY Bacon + Thomas
ATTORNEYS

Oct. 30, 1956 — E. L. CLINE — 2,768,711
HYDRO-KINETIC APPARATUS
Filed Oct. 12, 1951 — 12 Sheets-Sheet 12

INVENTOR.
BY Edwin L. Cline
Bacon + Thomas
ATTORNEYS

United States Patent Office 2,768,711
Patented Oct. 30, 1956

2,768,711

HYDRO-KINETIC APPARATUS

Edwin L. Cline, Altadena, Calif., assignor to Clayton Manufacturing Company, El Monte, Calif.

Application October 12, 1951, Serial No. 251,096

38 Claims. (Cl. 188—90)

The present invention relates to hydro-kinetic apparatus and more particularly to a rotary hydro-kinetic brake having general utility as a hydraulic brake or power absorption unit and, adapted for use in retarding the rotation of any rotating element or for absorbing the power or torque applied to any rotating element, such as the shaft of a prime mover or any member driven from such shaft.

The principal object of the invention is to provide hydro-kinetic apparatus which is of greatly reduced or "Junior" size, compared with all known prior units, but which will, notwithstanding, provide a much greater braking effect or power absorption capacity than much larger units.

An important object of the invention is to provide hydro-kinetic apparatus in which the flow of the liquid from the rotor to the stator, and from the stator back to the rotor is effected with a minimum of turbulence, vibration and vane shock.

Another object of the invention is to provide a practical, hydro-kinetic brake unit of such small size as to adapt the same for installation in any environment where limited space is a critical factor, and to extend the use of hydro-kinetic brake equipment to fields heretofore restricted because of the large size of such equipment.

Another object of the invention is to provide a rotary hydraulic brake unit adapted for use as a brake on a vehicle, as a brake on derrick reels, as an engine testing dynamometer, in a chassis dynamometer for testing motor vehicles, etc. In connection with chassis dynamometers, the small size of the unit is highly advantageous for the reason that it makes it possible to eliminate the angularly disposed drive connection, angle bearing mounts and full length rigid frame previously required in a pit or floor-type chassis dynamometer installation, for example, of the character disclosed in my prior Patent 2,452,550.

Still another object of the invention is to provide a hydro-kinetic brake unit which will meet the long felt need in the art of a power absorption unit that closely approaches in outside diameter the size of the drive and idle rolls used in commercially available chassis dynamometers.

Another object of the invention is to provide cooperating rotor and stator elements having vanes disposed therein with portions of the vanes relatively offset on predetermined angles so that the inter-flow of liquid between the rotor and stator and vice versa enters the receiving member substantially parallel with the vanes thereof.

Another object of the invention is to provide hydro-kinetic apparatus in which the rotor and stator vanes have an angular "correction" to prevent shock loading and destructive vibration, and to reduce impingement erosion to prevent abrasion of the members of the rotor and stator.

Still another object of the invention is to provide hydro-kinetic apparatus in which the liquid in traveling in its normal working circuit travels with a substantially uniform change of direction of flow.

Still another object of the invention is to provide hydro-kinetic apparatus having compact heat exchange means coaxially arranged therewith and readily detachable therefrom for inspection or replacement purposes.

A more specific object of the invention is to provide hydro-kinetic apparatus including a rotor member and a stator member in which the vane correction to avoid shock, vibration and turbulence is applied only to the vanes of one of said members, i. e., all of the vane correction at the outside diameter is applied to one of said members and all of the vane correction at the hub is applied to the other of said members.

Another specific object of the invention is to provide hydro-kinetic apparatus in which the angle of the vanes is corrected so that the necessary total vane angle correction for avoiding shock, vibration and turbulence is substantially equally divided between the rotor and stator vanes on either side of a theoretically optimum basic angle for the vanes.

Other objects and features of the invention will be apparent from the following description taken in conjunction with the accompanying drawings in which:

Fig. 2 is a view partly in cross-section showing the brake unit of Fig. 1 in left end elevation and illustrating further details of the chassis dynamometer;

Fig. 3 is a diagrammatic view illustrating the application of the present hydro-kinetic brake to a vehicle propeller shaft;

Fig. 4 is a vertical sectional view taken on the line 4—4 of Fig. 1 and showing the header for the heat exchanger in left side elevation;

Fig. 5 is a vertical sectional view taken on the line 5—5 of Fig. 1 showing the right side of a stator housing plate in elevation;

Fig. 6 is a vertical sectional view through the torus constituting the rotor member with the principal dimensions indicated thereon;

Fig. 7 is a view partly in section and partly in elevation of the stator torus member and stator plate, and particularly illustrating a dam mounted on the exterior of the stator torus;

Fig. 9 is a vertical sectional view taken on the line 9—9 of Fig. 1 illustrating the face of the rotor in elevation;

Fig. 10 is a view of the lee side of one of the hollow air-bleed vanes shown in Fig. 8;

Fig. 11 is a sectional view taken on the line 11—11 of Fig. 10;

Fig. 12 is an elevational view of another form of hollow stator vane adapted to provide a dry air-bleed;

Fig. 13 is an elevational view of the pressure side of the vane shown in Fig. 12;

Fig. 14 is an end view showing the leading edge of the vanes illustrated in Figs. 12 and 13;

Fig. 15 is an end elevational view of the opposite edge of the vanes shown in Figs. 12 and 13;

Figure 39:
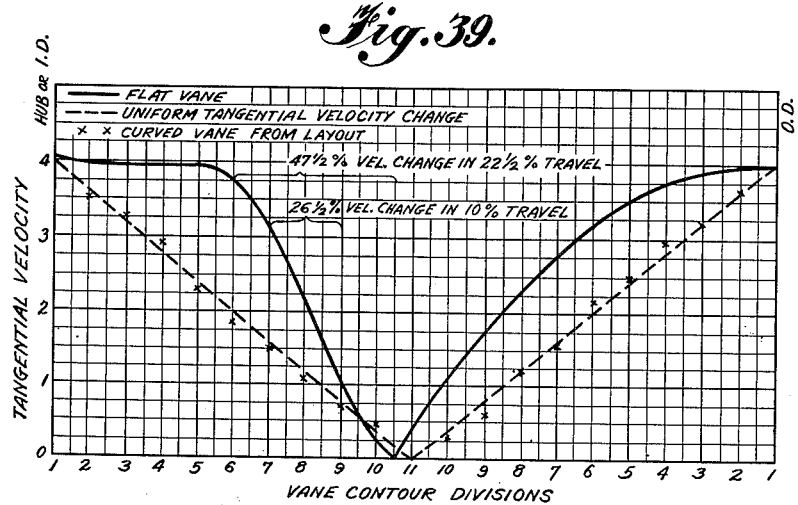
Figure 40:
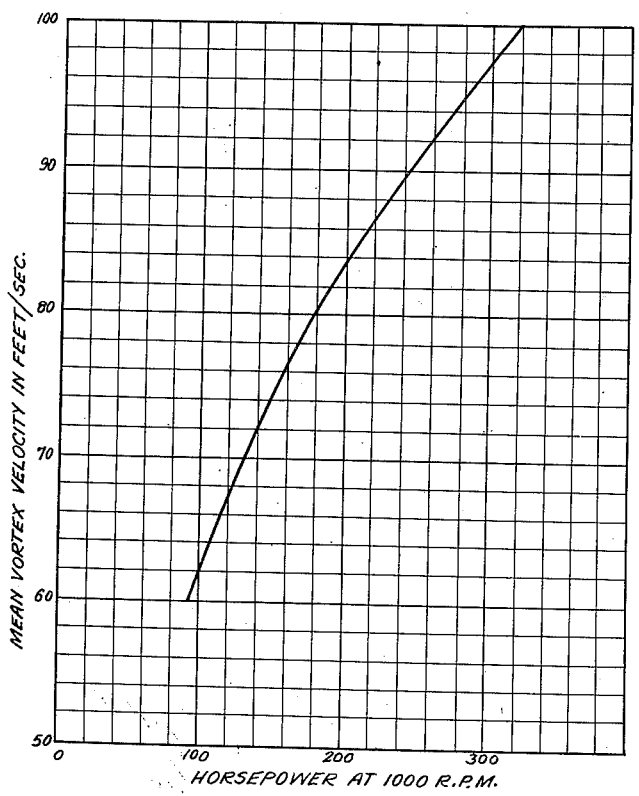
Figure 41:
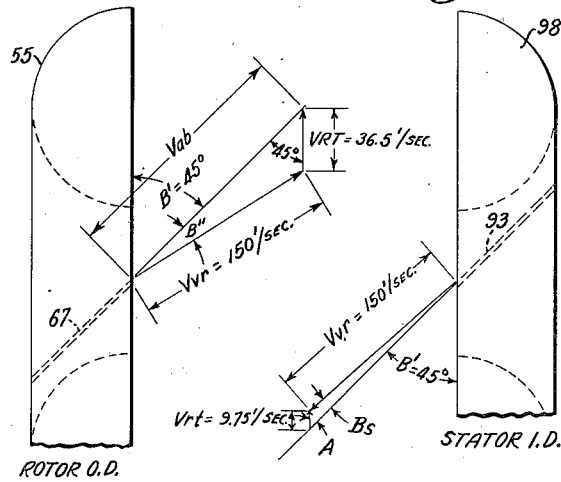
Figure 42:
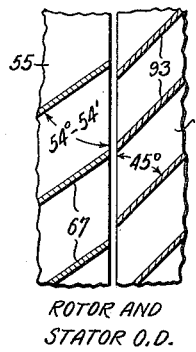
Figure 43:
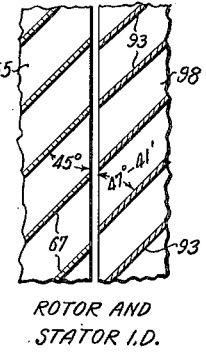
Figure 44:
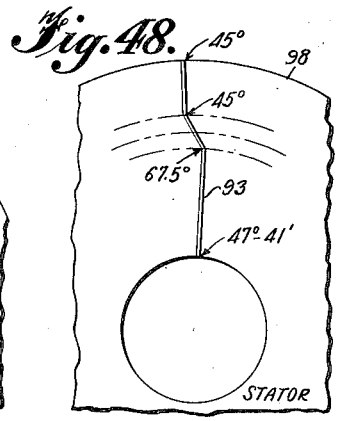
Figure 47:
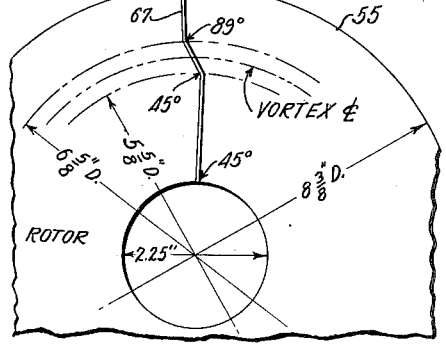
Figure 48:
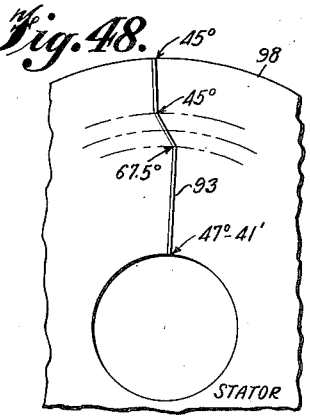
Figure 45:
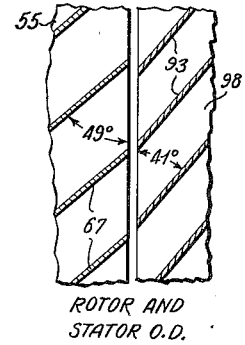
Figure 49:
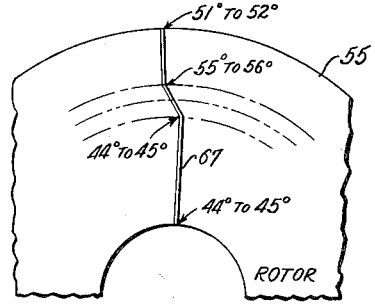
Figure 50:
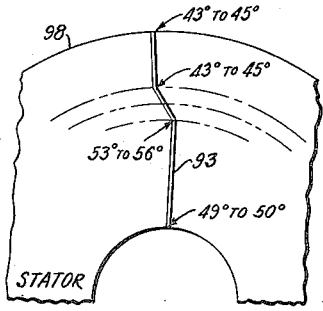
Figure 46:
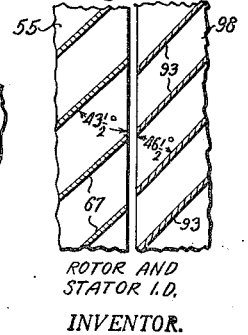

Figs. 16, 17, 18 and 19 are various sectional views taken on the lines 16—16, 17—17, 18—18, and 19—19, respectively, of Fig. 13 and particularly illustrating the curved cross-sectional contour of the air-bleed vane at different zones thereof;

Fig. 20 is an elevational view of the lee side of a plane stator vane;

Fig. 21 is an elevational view of the pressure side of the vane shown in Fig. 20;

Fig. 22 is an elevational view showing the leading edge of the stator vane of Figs. 20 and 21;

Fig. 23 is an elevational view showing the opposite edge of said stator vane;

Figs. 24 and 25 are sectional views taken on the lines 24—24 and 25—25, respectively, of Fig. 21 and illustrating the curvature provided in the body of the vane;

Fig. 26 is an elevational view of the lee side of one of the rotor vanes;

Fig. 27 is an elevational view of the pressure side of the rotor vane shown in Fig. 26;

Fig. 28 is an end view showing the leading edge of the rotor vane of Figs. 26 and 27;

Fig. 29 is an elevational view of the opposite edge of said rotor vane;

Figs. 30 and 31 are sectional views taken on the lines 30—30 and 31—31, respectively, of Fig. 27 and illustrating the curvature embodied in the rotor vane;

Fig. 32 is a diagrammatic view illustrating the direction of vortex flow of brake liquid between the rotor and stator and which provides the vortex velocity referred to hereinafter;

Fig. 33 is a diagrammatic view illustrating the vortex velocity at the periphery and hub of the rotor and stator;

Fig. 34 is a diagrammatic view illustrating the tangential velocity of the brake liquid which occurs as a result of rotation of the rotor;

Fig. 35 is a diagrammatic view illustrating the manner in which the vortex velocity and the tangential velocity of the rotor can be resolved to determine the absolute velocity of the brake liquid leaving the rotor;

Fig. 36 is a view similar to Fig. 35 but diagrammatically illustrating the absolute velocity of the liquid leaving the stator and its velocity in relation to the rotor;

Fig. 37 diagrammatically illustrates the increase in vortex velocity resulting from the tangential component of the vortex velocity;

Fig. 38 diagrammatically illustrates the radius of gyration of a rim section theoretically corresponding to the liquid discharged from the rotor;

Fig. 39 is a graph illustrating the relationship between the tangential velocity change with a 45° flat vane and the uniform change desired, plotted against equal divisions along the vane-torus contact line;

Fig. 40 is a graph illustrating the relationship between horsepower at 1000 R. P. M. and the mean vortex velocity of the brake liquid;

Fig. 41 diagrammatically illustrates the vectors and angles involved in determining the vane correction at the leading edge of a rotor vane at the rotor O. D.;

Fig. 42 is a similar diagrammatic view but illustrates the factors involved in determining the correction in the angle at the leading edge of the stator vane at the stator I. D.;

Fig. 43 diagrammatically illustrates the angle of vane correction between the rotor and stator vanes at the outer diameter of the rotor and stator cavities (hereinafter referred to as O. D.) with a 45 degree basic vane angle and with all correction at the O. D. incorporated in the rotor vane;

Fig. 44 is a view similar to Fig. 43 except that it illustrates the vane correction at the hub or inner diameter of the rotor and stator cavities (hereinafter referred to as I. D.) with all correction at the I. D. incorporated in the stator vane;

Fig. 45 is a diagrammatic view illustrating the vane correction at the rotor and stator O. D. with a differential of 8 degrees equally divided on either side of the basic vane angle;

Fig. 46 is a view similar to Fig. 45 but illustrating the vane correction at the rotor and stator I. D. with a 3 degree angular differential equally divided on either side of a 45 degree basic angle;

Fig. 47 diagrammatically illustrates the theoretical vane correction angles at the leading edge of a rotor vane, including angular corrections in the region of the vortex center;

Fig. 48 diagrammatically illustrates the theoretical vane angle corrections at the leading edge of a stator vane; and Figs. 49 and 50 are views similar to Figs. 47 and 48, but diagrammatically illustrate vane angle corrections at the leading edges of rotor and stator vanes, respectively, which while differing slightly from the theoretical, were found in actual practice to be satisfactory.

Figure 1:
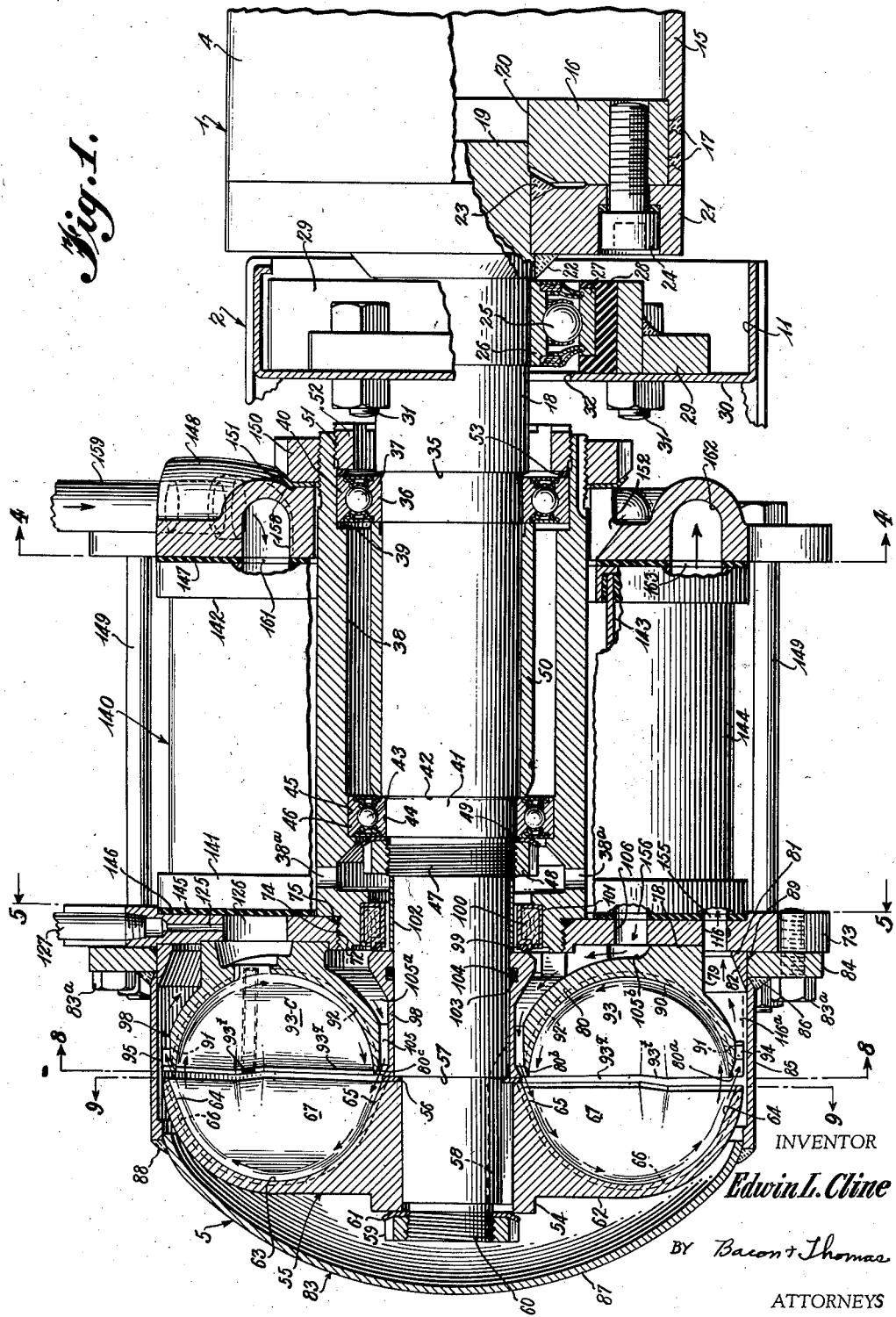
Fig. 1 is a longitudinal sectional view, partially in diagrammatic form, through a hydro-kinetic brake unit embodying the principles of the present invention and shown, by way of example and not limitation, connected with a drive roll of a chassis dynamometer.

Referring now to Figs. 1 and 2 of the drawings, the chassis dynamometer is generally identified by the numeral 1 and normally includes a pair of frame assemblies at the opposite ends thereof, (as shown in my co-pending application Serial No. 251,095, filed on Oct. 12, 1951), but only one of which frame assemblies is disclosed herein and generally identified by the numeral 2. The dynamometer further includes hollow, parallel idle and drive rolls 3 and 4, respectively, a hydraulic brake unit 5 embodying the principles of the present invention and directly connected to the drive roll 4, and ramp means 6 of any suitable or conventional construction for aiding in backing a vehicle on to the rolls 3 and 4.

The frame assembly 2 differs in some minor details from that shown in my application, supra, but nevertheless comprises longitudinally extending channel members 9 and 10 and transverse channel members 11 and 12 having flanged ends received in the channel members 9 and 10, the several channels being secured together by rivets 13 and being welded as indicated at 14 to render the frame assembly more rigid.

The roll 4 may be driven by any source of power, for example, the driven wheels of a motor vehicle (not shown). The complete assembly of the roll 4 is dynamically balanced to minimize vibration and comprises a hollow cylindrical portion 15 (Fig. 1) having a closure plate 16 mounted in one end thereof and permanently secured thereto by centrifugal welding as indicated at 17. The brake unit 5 includes a shaft 18 having a reduced pilot end portion 19 received in an opening 20 in the plate 16. The flange 21 is welded to the reduced end 19 of the shaft 18 by continuous welds indicated at 22 and 23. The flange 21 is secured to the plate 16 by a plurality of countersunk cap screws 24.

A conventional ball bearing 25 has its inner race 26 mounted on the shaft 18 adjacent the flange 21 and an outer race 27 of said bearing is mounted in a rubber grommet 28 carried by a bearing housing 29. The housing 29 is secured to the bottom wall 30 of the channel member 11 by a plurality of bolts 31. The upper side wall and the bottom wall 30 of the channel member 11 are jointly provided with a recess 32 so that the shaft 18 and roll 4 can be more readily assembled therewith.

It will be understood that the opposite end of the roll 4 is suitably supported by a bearing and frame (not shown). It will be noted that the ball bearing 25 is disposed between the brake unit 5 and the roll 4 so that the actual weight of the brake unit 5 is supported in cantilever fashion solely by the shaft 18. While the shaft 18 has been shown directly connected with the drive roll 4 of a chassis dynamometer, it is to be understood that the shaft 18 can, with equal facility, be connected with any other driven member and that the brake unit 5 is not limited to use in a chassis dynamometer.

The idle roll 3 is supported at one end in a bearing housing 32 (similar to the bearing housing 29) secured to the channel member 11 by bolts 34. It will be understood that the opposite end of the roll 3 is supported in a similar bearing in a frame (not shown).

The shaft 18 has a reduced shoulder portion 35 to receive the inner race 36 of a conventional ball bearing 37. An elongated stator mounting sleeve 38 is disposed concentric with the shaft 18 and is provided with a counterbore 39 to receive the outer race 40 of the ball bearing 37.

The shaft 18 has another reduced portion 41 spaced axially from the reduced shoulder portion 35 and defined in part by a shoulder 42. A second conventional ball bearing 43 has its inner race 44 mounted upon the reduced portion 41 and engaged with the shoulder 42. The sleeve 38 has a shouldered pad 45 formed on the interior thereof for receiving the outer race 46 of the ball bearing 43. The shaft 18 has a threaded portion 47 adjacent the reduced portion 41 and a lock nut 48 is engaged with the threaded portion 47 for tightly clamping the bearing race 44 against the shoulder 42, a locking ring 49 being interposed between the race 44 and the lock nut 48 for retaining the same in tightened condition. A spacer 50 is mounted on the shaft 18 between the inner race 36 of the bearing 37 and the inner race 44 of the bearing 43 to maintain the bearing 37 in predetermined spaced relation with respect to the bearing 43. The sleeve 38 is interiorly threaded as indicated at 51 to receive an exteriorly threaded locking ring 52. A rubber O-ring 53 is disposed between the outer race 40 of the bearing 37 and the inner end of the locking ring 52 to form a resilient reserve ring, the locking ring 52 serves the function of retaining the bearing 37 in engagement with the spacer 50 and also functioning to restrain longitudinal movement between the sleeve 38 and the shaft 18. The bearing 37 is pre-loaded to a pressure of about 300 pounds by suitable adjustment of the locking ring 52. Thus, the shaft 18 is arranged so that it can rotate freely but not move longitudinally relative to the sleeve 38.

The end of the shaft 18 remote from the drive roll 4 is reduced in diameter to receive thereon the hub portion 54 of a rotor assembly 55. The inner end of the hub 54 engages a spacer ring 56 disposed in contact with still another shoulder 57 on the shaft 18 spaced a predetermined distance from the shoulder provided at the threaded portion 47. A key 58 secures the rotor assembly 55 in non-rotatable relation to the shaft 18. A nut 59 is mounted upon a threaded portion 60 at the extreme end of the shaft 18 and prevents longitudinal movement of the rotor assembly 55 relative to the shaft 18. A lock washer 61 holds the nut 59 against inadvertently loosening.

The rotor assembly 55 comprises a cast steel rotor member 62 formed integral with the hub portion 54. The rotor member 62, in one operative example of the invention, has the principal dimensions indicated in Fig. 6, wherefrom it will be noted that said member is in the geenral form of a torus and has a substantially semitoroidal cavity 63 formed therein on a true radius R equal to 1.531 inches, and that the cavity has an O. D. of 8.375 inches. The centers of the radii R are spaced 5.315 inches apart, wherefor, the I. D. of the cavity is 2.25 inches. The outer curved portion of the member 62 is formed on a radius of 1.718 inches. The outside diameter of the rotor member 62 is, therefore, unusually small, namely, about 8¾ inches. The portion of the cavity 63 at the outer diameter is preferably flared from a true radius as indicated at 64 so that it is disposed 90 degrees to a radius 22½ degrees from the plane of the inner face of the rotor member. Such flaring has the effect of enlarging the marginal portion of the rotor cavity 63 for a purpose which will be explained later. The inner portion of the cavity 63 is also preferably flared from a true radius as indicated at 65 to further enlarge the cavity 63 for a purpose which will also be explained later.

The rotor 55 has twenty-one grooves 66 of a width of .065 inch milled on the cavity 63 to receive the inner edges of a corresponding number of rotor vanes 67 (Fig. 1), which vanes will be described in greater detail hereinafter. The grooves 66 are disposed on an angle of 53 degrees clockwise to the plane of the inner face of the rotor 55. The inner end of each groove 66 lies on a true radial line, but the outer end of said groove is set back from the radial line on an angle of 9½ degrees, as shown in Fig. 9. The vanes 67 are of special construction to provide for smooth flow of brake liquid without creating vibration, shock, or undesirable turbulence. The vanes 67 are mounted in the grooves 66 and clamped or tack-welded in place at two or more points and then permanently secured to the member 62 in a conventional hydrogen brazing furnace which assures a smooth joint at the juncture of the vanes with the member 62 at the grooves 66.

The rotor vanes 67 are shown in detail in Figs. 26 to 31, inclusive, and are preferably formed from 1/16 inch thick stainless steel sheet metal, for example, type 321 stainless steel, although it is to be understood that any other suitable kind of metal can be employed. Each vane 67 has an inner edge 67a contoured to fit the cavity 63, but which is straight as shown in Fig. 29. The vanes 67 are seated in the rotor member 62 so that the inner or leading edges 67b thereof are disposed substantially flush with the adjacent inner and outer marginal portions of said member. Each vane has portions 67c and 67d which are disposed in different angular planes commencing at the leading edge 67b, as will be explained more fully hereinafter. An offset portion 67e is disposed between the portions 67c and 67d and lies at the center of the vortex of the working circuit. The grooves 66, of course, are straight and of a width to snugly receive the inner edges 67a of the vanes 67 therein to hold the vanes firmly in place. Inasmuch as the cavity 63 is substantially truly semi-circular in radial cross-section the maximum width of the vanes 67 is necessarily greater than the radius R, and the vanes have the predetermined lee and pressure side configurations illustrated in Figs. 26 and 27, respectively.

The stator supporting sleeve 38 is shouldered to provide a reduced threaded portion 72 at its inner end. A stator housing plate 73 serves as an end wall and has a circular opening 74 provided with threads for mounting said plate upon the threaded end 72 of the sleeve 38 in tight engagement with the adjacent shoulder. The inner edge of the opening 74 is chamfered and a conventional sealing ring 75 is disposed in the chamfered region to form a liquid-tight joint between the plate 72 and the sleeve 38 when the parts are tightly assembled. The plate 73 has an annular recess 78 formed in one face thereof which is generally flat and complemental to the adjacent surface of an annular boss 79 formed on a cast steel stator member 80 which is interposed between the plate 73 and the rotor 55.

The plate 73 has another recess 81 concentric with the annular recess 78, but of larger diameter adapted to serve as a seat for a ring 82, which is generally triangular-shaped in radial cross-section and has the base thereof received in the recess 81. The stator member 80 and the rotor 55 are enclosed by a heavy sheet metal housing or cover 83 comprising diametrically opposite mounting flanges 84, a cylindrical portion 85 secured to the mounting flange by a continuous weld 86 and a dished or dome-shaped section 87 secured to the outer end of the cylindrical member 85 by continuous welding indicated at 88. The cover 83 is maintained in alignment with the housing plate 73 through the engagement of the ring 82 with the inner surface of the flange 84 and the cylindrical member 85. A conventional sealing ring 89 is interposed between the ring 82 and a chamfered inner marginal portion of the flange means 84 to form a water-tight joint between the housing cover 83 and the cooperating housing plate 73. The cover 83 and plate 73 are detachably secured together by four cap screws 83a (see Figs. 1, 2 and 8).

The stator member 80 is reduced in diameter by chamfering the same on an angle of about 15 degrees as indicated at 80a (Fig. 7) and by providing a cylindrical portion 80b adjacent said chamfer. Thus, the outer diameter of the stator member 80 is slightly less than that of the flared portion 64 of the cavity 63 in the rotor member 62. The inner edge of the stator member 80 is chamfered on an angle of about 22½ degrees, as shown at 80c. The stator member 80 has an annular cavity 90 formed on the same radius R as the rotor cavity 63 so that it is truly semi-circular throughout in radial cross-section.

Figure 8:
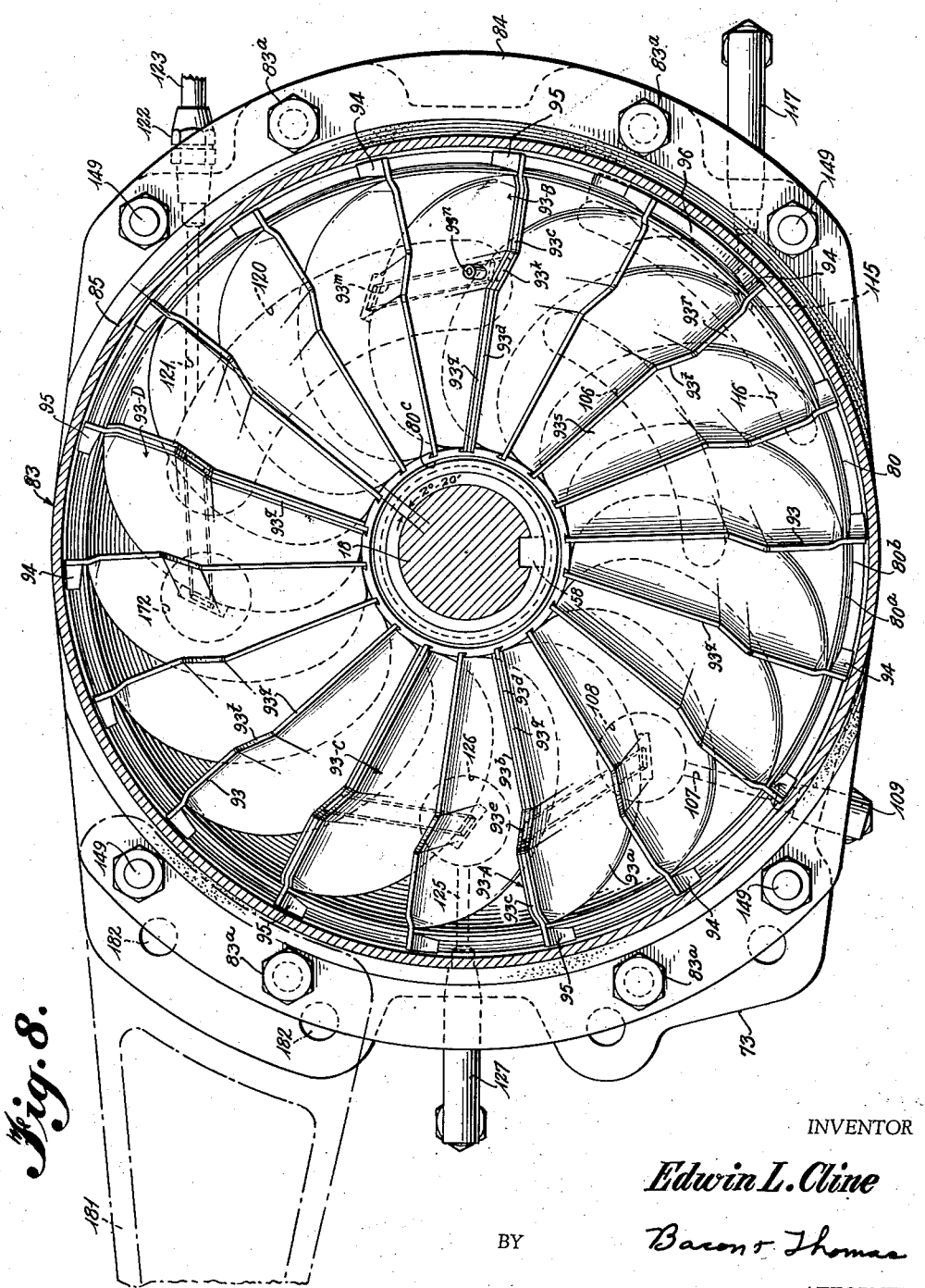
Fig. 8 is a vertical sectional view taken on the line 8—8 of Fig. 1 showing the face of the stator in elevation.

The stator member 80 is also provided with a series of eighteen notches 91 at its outer rim portions and a corresponding number of milled grooves 92 extend inwardly from said notches and transverse the entire cavity 90. The notches 91 and the grooves 92 are 1/16 inch wide and are disposed on an acute angle of about 53 degrees clockwise with respect to the plane of the inner face of the stator member 80. The outer end of each groove lies on a true radial line intersecting the outer rim of the stator but the inner end is set back on an angle of 2°–20' from said radial line, as indicated in Fig. 8. Fourteen plain stator vanes 93, one hollow loading vane 93-A, and three hollow air-bleed vanes 93-B, 93-C and 93-D are disposed in the cavity 90, with the leading edges of all of said vanes lying substantially in the same general plane as the inner face of the stator member 80, and the opposite edges being received in the grooves 92, as best indicated in Fig. 1.

Thus, the stator member 80 has a total of eighteen vanes in contrast with the twenty-one vanes on the rotor 55. The fourteen plain vanes 93 are each provided with a tab 94 at the outer end thereof adapted to be received in one of the notches 91 and to project outwardly beyond the stator member 80 into close proximity to the cover portion 85 to serve as a pumping guide vane for liquid diverted from the rotor. The hollow vanes 93-A, 93-B, 93-C and 93-D are also each provided with a similar end tab 95 received in a notch 91 and projecting to form similar pumping guide vanes. Other details of construction of the stator vanes will be described later. A dam 96 (see Fig. 7) is mounted upon the exterior of the stator member 80 in angular alignment with the tab 94 of one of the plain stator vanes 93 for a purpose which will be explained later. The dam 96 is welded to the stator as indicated at 97.

The stator assembly is generally identified by the numeral 98 and in fabricating the same, the parts thereof including the housing plate 73, ring 82, stator member 80, and vanes 93, 93-A, 93-B, 93-C and 93-D are manually placed in the relative positions which they are to occupy when assembled and then firmly clamped or tack-welded at two or more points, and placed in a hydrogen brazing furnace to permanently unite the parts into a unitary assembly. After the stator has thus been assembled, the plate 73 is mounted upon the sleeve 38, as aforedescribed.

The uniting of the rotor and stator vanes with their associated rotor and stator members by the use of a conventional hydrogen brazing process, eliminates the rough fillets, etc. that would normally be formed by the conventional arc welding process and provides fairly smooth bonding joints between the rotor and stator members and their vanes. The elimination of rough fillets, even though these should be located only on the lee side of the vanes, results in a substantial increase in the power absorption capacity of the unit because of the decrease in the fluid friction loss as the brake liquid travels through its normal working circuit. Hence, all parts of the working circuit should be made as smooth as possible.

In order to prevent leakage of liquid along the shaft 18 from the housing formed by the plate 73 and the cover 83, a stainless steel sleeve 98 is positioned on the shaft 18 so that one end thereof engages with the spacer ring 56 and its other end is engaged by a non-rotating carbon ring 99 constituting part of a conventional packing assembly 100 which is press-fitted into a recess 101 formed in one end of the sleeve 38. The carbon ring 99 and the adjacent end of the sleeve 98 have a lapped fit to form a fluid-tight seal. A spacer 102 is disposed between the shoulder provided by the threads 47 and the adjacent end of the sleeve 98 so that the sleeve 98 is required to remain in a fixed position on the shaft 18 and to rotate with the shaft. The sleeve 98 has an internal groove 103 in which a conventional O-ring packing 104 is mounted to form a seal between the shaft 18 and the inner periphery of the sleeve 98. Thus, leakage along the shaft 18 is prevented.

It will be noted from Fig. 1 that the inner marginal edge of the stator member 80 is spaced from the outer periphery of the sleeve 83 to provide an annular port 105 between said stator member and sleeve. This port merges into a relatively large chamber 105a between the sleeve 98 and the inner side of the boss 79. Portions of the boss 79 are cut away to provide two radial passages 105b (Fig. 5) which communicate with a return port 106 in the plate 73 for receiving cooled brake liquid from a heat exchanger, as will be pointed out more fully hereinafter.

The carbon ring 99 in conjunction with the conventional packing 100 further prevent leakage of brake liquid between the stator member 80 and the sleeve 38. In the event that any liquid should leak along either the shaft 18, past the packing 104, or between the carbon ring 99 and the end of the sleeve 98, it will enter the sleeve 38 in the region adjacent the nut 48 and discharge through drain openings 38a in the sleeve 38 and thus be prevented from gaining access to the ball bearing 43.

The packing means described hereinbefore is constructed of materials adapted to form a seal under either wet or dry operating conditions so that no damage thereto can result if the roll 4 and shaft 18 are driven when no water or other brake liquid is present in the stator housing 73, 83.

Referring now to Figs. 5 and 8, the plate 73 has a passageway 107 drilled therein which communicates at its inner end with a circular opening 108 and is threaded at its outer end to receive a conventional fitting 109 having a water supply or loading conduit 110 connected thereto. A conventional valve 111 (Fig. 2) is connected in the conduit 110 and is adapted to control the flow of water or other liquid into the brake housing for loading purposes. The loading valve 111 may be connected in the supply conduit 110 and be remotely electrically controlled in the manner disclosed in my prior Patent 2,452,550, or otherwise. It will be noted from Fig. 5 that the opening 108 is disposed opposite the inner edge of the loading vane 93-A, which projects through a slot in the stator member 80 and into a cavity 112 in said stator member. This vane is similar to the hollow air-bleed vanes 93-C and 93-D and is identical in contour to the plain vanes 93. The vane 93-A is shown in Figs. 10 and 11 and differs slightly from the air-bleed vane 93-B shown in detail in Figs. 12 to 19, inclusive.

The hollow vanes are all preferably made of laminated construction, assembled from stainless steel sheet metal stampings. Referring first to Figs. 10 and 11, hollow vane 93-A comprises elongated plates 93a and 93b separated by core pieces 93c and 93d spaced apart longitudinally to provide a passageway 93e. Each of the plates 93a and 93b is 1/32 inch thick, and the core pieces 93c and 93d are 1/16 inch thick, so that the maximum thickness of the vane is 1/8 inch. The end tab 95, previously referred to, projects from the upper core piece 93c and is made substantially 7/16 inch in length. The passage 93e may be made of any suitable size, but in the present construction it has a height of about ¼ inch and a width of about 1/16 inch. The several laminations comprising the hollow vane 93–A may be permanently secured together in any suitable manner, such as, by welding or brazing.

It will also be noted that the plates 93a and 93b are provided with side tabs 93g and 93h, respectively, of a width substantially greater than the height of the passageway 93e. The upper core member 93c has a side tab 93i and the lower core member 93d has a side tab 93j. The several side tabs terminate in stepped relation, as best shown in Fig. 11, so that when the vane is angularly mounted in the stator member 80, the tab ends are flush with the exterior of said member. The projecting composite side tab is received in a slot extending through the stator member 80 in a region opposite the opening 108 in the plate 73, as previously mentioned, so that the outer end of the passage 93e communicates with the supply conduit 110. The inner end of the passage 93e is so located that it opens into the center of the vortex of the working circuit, or in other words, into a low pressure zone of the working circuit, whereby to facilitate the introduction of brake liquid into the working circuit to increase the load absorption capacity of the brake unit, as desired.

The vane plates 93a and 93b stop short of the marginal edges of the core pieces 93c and 93d so that the core pieces have projecting edges that can be received in the stator grooves 92, while the edges of said plates abut the wall of the cavity 90.

Referring to Figs. 12 to 19, the air-bleed vane 93–B includes the same structural parts thus far described in connection with vane 93–A, but differs therefrom in that an insert 93k is positioned between the core pieces 93c and 93d at the leading edge of the vane to provide a passage 93m that is blocked at its inner end. A further difference lies in the fact that a short section of tubing 93n is mounted in an opening 93p by soldering or brazing the same in place, with the inner end of the tube communicating with the passage 93m. The tube 93n is disposed on the lee or low pressure side of the vane, is about 1/4 inch long and has a 1/8 inch passageway formed therein. Further, the tube 93n is positioned with its axis about 3/8 inch from the adjacent edge of the vane. The provision of the tube 93n facilitates removal of air from the working circuit without loss of brake liquid, and assures a dry-air-bleed, as will be explained more fully hereinafter.

The core pieces 93c and 93d have rear edge portions a and a', respectively, which are disposed in vertical alignment, as best shown in Fig. 15 and are adapted to be received in a common groove 92 in the stator member 80. The plain stator vanes 93 have an uninterrupted rear edge a'' which is also straight, as best shown in Fig. 23. The vanes 93 and 93–A to 93–D have a leading edge 93q normally disposed substantially flush with the adjacent inner and outer marginal portions of the stator member 80. Each of these vanes has portions 93r and 93s lying in different angular planes commencing at the leading edge 93q, as will be explained more fully hereinafter. An offset portion 93t is disposed between the portions 93r and 93s and lies at the center of the vortex of the working circuit.

Referring now again to Figs. 5 and 8, the housing plate 73 is also provided with a passage 115, which communicates at its inner end with an elongated arcuate discharge port 116 cut through the plate 73 and arranged concentric with the axis of the shaft 18. A conventional fitting 117 is threaded into the outer end of the passage 115 and connects one end of a discharge or unloading tube 118 to said plate. A conventional valve 119 (Fig. 2), similar to the valve 111 is connected in the tube 118 and is adapted to serve as an unloading valve, in that it can be opened whenever it is desired to drain brake liquid from the working circuit to reduce the load absorption capacity of the brake unit.

In order to facilitate unloading of the brake unit 5, and to avoid creating either a subatmospheric or superatmospheric pressure condition within the brake housing 73, 83, means is provided to assure the ready ingress or egress of air, as conditions may require, from the working circuit of the dynamometer. To this end, the plate 73 is provided with an arcuate air collecting slot or expansion chamber 120, Figs. 5 and 8, disposed concentric to the axis of the shaft 18, but in non-registering relation with the discharge port 116. A passageway 121 is drilled into the plate 73 and its inner end communicates with the upper portion of the chamber 120. The outer end of the passage 121 has a conventional fitting 122 threaded therein for connecting an air vent tube 123 to the plate 73. The tube 123 is always open to the atmosphere so that air can be freely exhausted therethrough from the chamber 120 during loading, or pass into the chamber to prevent the formation of a vacuum condition within the brake unit 5 during unloading. The hollow vane 93–B has its outer edge disposed in the zone of the air chamber 120 and its side tab extends through a slot 124 and into a cavity 125 in the stator member 80 so that passage 93m serves as an air-bleed by establishing communication between the air chamber 120 and the low pressure region of the working circuit. More than one of the vanes in the region of the air chamber 120 may be of the air-bleed type, if desired. Also, all air-bleed vanes may be alike.

A second air vent passageway 125 (Figs. 5 and 8) is drilled into the edge of the housing plate 73 and its inner end communicates with a circular opening 126 cut through the plate 73. A conventional fitting 127 is threaded into the outer end of the passageway 125 and connects one end of an air-bleed tube 128 thereto. The opening 126 is disposed opposite a slot 129 in the stator member 80 through which the side tab of the inner edge of the hollow vane 93–C projects. The vane 93–C has an air-bleed passageway 130 extending therethrough for establishing communication between the opening 126 and the center of the vortex of the working circuit. Any air bled from the working circuit through the air-bleed passageway 130 is enabled to escape to the atmosphere through the air-bleed tube 128.

The air-bleed vanes 93–B and 93–C are so arranged in the stator member 80 as to provide an efficient air-bleed which will allow the air to escape from the housing without carrying any brake liquid with it; otherwise the maintenance of a constant load would be affected. A plurality of air-bleed vanes is preferable to a single vane, and in the present construction, the two air-bleed vanes 93–B and 93–C are so located in relation to one another that a pressure differential will exist as a result of the slight pulsations set up in the operation of the unit allowing the air and any liquid entrained thereby to separate before the air is discharged to the outside atmosphere. These pulsations have the effect of tending to "milk" the expansion chamber 120 and the opening 126 of liquid thereby keeping the same substantially dry.

The distance between the confronting or leading edges of the rotor vanes 67 and the stator vanes 93, 93–A to 93–D has a marked effect upon the power absorption capacity of the brake unit. A clearance of about 3/32 inch has been found to be optimum for the present unit.

It is well understood in connection with hydraulic power absorption apparatus, either dynamometers or brakes, that the absorption of power by the liquid in the working circuit of the dynamometer causes the liquid to become heated. In other words, the energy absorbed by the liquid in the brake unit is converted into heat, and such heat must be dissipated if vaporization of the brake liquid is to be avoided.

It is equally well known that, if vaporization of the brake liquid occurs within the brake housing, vapor pockets are formed in the working circuit and unsteady, unsatisfactory operation of the unit results.

The present brake unit overcomes the foregoing objections by incorporating therein a heat exchanger apparatus capable of quickly dissipating the heat imparted to the brake liquid as a result of retarding rotation of the shaft 18. However, it is to be understood that the present brake unit is useful without a heat exchanger in environments or under conditions which do not cause objectionable heating of the brake liquid.

The heat exchange circuit contemplated herein embodies the principles of the "closed" circulating system disclosed in my prior patent, supra, although the present heat exchanger is constructed and arranged differently in keeping with the objective of providing a power absorption unit of extreme compactness and unusual power absorption capacity for its size.

The heat exchanger is generally identified by the numeral 140 in Fig. 1, and is generally annular and adapted to be constructed as a separate unit. The details of the heat exchanger are not important for present purposes and, therefore, have not been disclosed in detail herein. However, the heat exchanger is fully disclosed in my copending application Serial No. 251,095. Hence, only those portions of the heat exchanger which are necessary to an understanding of the present invention will be referred to.

The heat exchanger 140 is disposed in surrounding relation to the stator sleeve 38 and comprises a housing having end members 141 and 142 and inner and outer concentric cylindrical members 143 and 144 disposed between said end members. A heat exchange element of any suitable construction (not shown) is, of course, disposed in the housing for cooling the brake liquid. A gasket 145, made of rubber or any other suitable material, is disposed in a recess 146 formed in the plate 73 and is engaged by the end member 141. Another gasket 147 is disposed between the other end member 142 and a corrosion resisting header casting 148.

The heat exchanger 140 and the gaskets 145 and 147 are held together in leak proof condition between the plate 73 and the header 148 by four tie-bolts 149, which extend through suitable apertures in the header 148, plate 73 and the cover flanges 84. The heat exchanger 140 is also held fixed relative to the sleeve 38 by a clamping nut 150 and a locking ring 151 mounted upon a threaded portion of the adjacent end of said sleeve.

The header has at least one passage 152 adapted to serve as a bleed for draining any brake liquid discharged as leakage into the space between the sleeve 38 and member 143 through the drain holes 38a in said sleeve.

The discharge port 116 in the stator plate 73 communicates with a brake liquid inlet port 155 extending through the gasket 145 and end member 141 of the heat exchanger 140. The return port 106 in the plate 73, on the other hand, communicates with a brake liquid discharge port 156 extending through the gasket 145 and the same end member 141 of the heat exchanger 140.

Referring now to Figs. 1 and 4, the header 148 is provided with an inlet passageway 158 having a supply pipe 159 threadedly mounted therein for connection with a source of cooling water. As a matter of convenience the supply conduit 110 of the brake unit 5 may be connected with the pipe 159, as shown in Fig. 2. The inlet passage 158 is flared in a circumferential direction and greatly enlarged in the region 160, as best shown in Fig. 4. The gasket 147 and end member 142 of the heat exchanger 140 have a coolant inlet port 161 (Fig. 1) communicating with the passageway 158.

The header 148 is also provided with an elongated discharge or outlet passageway 162 for the coolant, and which passageway opens through the inner face of said header. The gasket 147 and the end member 142 have a discharge port 163 communicating with the passageway 162. A drain pipe 164 is threaded into the outlet of the discharge passageway 162, and the unloading tube 118 may be conveniently connected thereto, as shown in Fig. 2.

The brake liquid is forced by the pumping action of the rotor 55 to flow at high velocity through the heat exchanger 140 to effect rapid cooling of the brake liquid. In the normal operation of the brake unit described hereinbefore, the cooling element (not shown) of the heat exchanger 140 is completely filled with brake liquid, and the volume of brake liquid in excess of that required to fill said cooling element is utilized for power absorption purposes. Cooled brake liquid is, therefore, discharged at the outlet port 156 at the same rate as it is forced into the inlet port 155 by the pumping action of the rotor 55.

Thus, a "closed" circulating system is provided wherein the volume of brake liquid is constant for any given load. The cross-sectional area of the stator discharge port 116 is sufficiently greater than that of the stator return port 106 to maintain a slight back pressure at all times on the brake liquid passing through the heat exchanger 140.

Air-locking of the cooling element (not shown) of the heat exchanger 140 is avoided by providing a plurality of air-bleed holes 170, shown in dot-and-dash lines in Fig. 5, in the end member 141 and an elongated slot 171 in the gasket 146 in the region of a circular opening 172 formed in the plate 73. The side tab of the vane 93–D extends through a slot 173 in the stator member 80 in the zone of said opening and has an air-bleed passage 174 whose outer end communicates with said opening. The inner end of the passage 174 communicates with the vortex of the working circuit, whereby any liquid that may flow through the air-bleed holes 170 into the opening 172 is readily returned to a low pressure zone of the working circuit through the vane passage 174. It will be understood that air thus bled into the vortex from the heat exchanger 140 can escape to the outside atmosphere through either of the air-bleed vanes 93–B or 93–C and their associated air-bleed tubes 123 and 128, respectively.

Referring now to Fig. 2, the stator housing plate 73 has a lug 180 projecting outwardly therefrom in a direction toward the channel member 9 of the frame 2. One end of a torque arm 181 is secured to the lug 180 by a plurality of cap screws 182. One of the tie-bolts 149 also extends through the torque arm 181. The other end of the torque arm 181 is connected to a rod 183 of a torque bridge device 184 adapted for use with indicating means (not shown) for visually indicating the power being developed by the engine of the vehicle undergoing test. The torque bridge device 184 is mounted upon a support 185 suitably connected to the channel members 11 and 12. The torque bridge device 184 forms no part of the present invention and, therefore, has not been illustrated or described in detail herein.

It will be understood that the stator vanes 93, 93–A, 93–B, 93–C and 93–D provide a series of pockets in the stator member 80 to form one-half of the working circuit for the brake liquid; the other half of the working circuit being formed by the confronting pockets formed by the vanes 67 in the rotor member 62. As is best illustrated in Figs. 1, 7 and 8, the end tabs 95 on the hollow vanes 93–A to 93–D extend radially beyond the outer periphery of the stator member 80 and cooperate with the portion 85 of the cover 83 to provide a plurality of channels which communicate with an annular chamber 116a disposed between the stator boss 79 and the inner surface of said cover. As the rotor 55 turns, the brake liquid flows in the working circuit in the direction indicated by the arrows in Fig. 1. In this connection, it should be noted that the outer chamfered margin 80a of the stator member 80 cooperates with the enlarged confronting portion of the rotor pockets, and is substantially parallel with the portions 64 of said pockets, to divert a portion of the brake liquid from the working circuit for flow into the channels between the tabs 94 and 95 all the way around the stator. The length and angular disposition of the tabs can be varied to some extent without adversely affecting performance. The brake liquid discharged from the rotor pockets flows into the chamber 116a in much the same manner as the liquid in a centrifugal pump. The brake liquid, therefore, has a rotational velocity imparted to it in the direction of rotor rotation and the dam 96 retards such rotation. The dam 96 is so located that it directs water to the elongated port 116 in the plate 73 for continuous discharge into the heat exchanger through the heat exchanger inlet port 155. The cooled brake liquid leaves the outlet port 156 of the heat exchanger and then enters the inlet port 106 in the plate 73 from whence it flows into the annular chamber 105a and, finally, through the annular port 105 between the inner marginal portion of the stator member 80 and the sleeve 98 surrounding the shaft 18 where it then flows past the chamfered inner edge 80b of said stator member and mingles with the brake liquid discharging from the stator pockets into the rotor pockets.

It will be apparent from the foregoing that, when a vehicle has its rear or driven wheels engaged with the idle roll 3 and the drive roll 4, the rotor 55 will be driven at the same speed as the drive roll 4 and will cause the brake liquid to flow through the working circuit defined by the confronting pockets and vanes of the rotor 55 and stator 98 at very high velocity.

The load absorption capacity of the brake unit 5 can be varied at will by manipulation of the loading valve 111 and the unloading valve 119. Opening of the loading valve 111 will admit liquid into the working circuit through the loading conduit 110, passage 107 in the plate 73 to the opening 108 in said plate and, hence through the passage 93e in the loading vane 93-A for discharge from the inner end of said passage at the center of the vortex or low pressure zone of the working circuit. However, when it is desired to reduce the load absorption capacity of the brake unit 5, the unloading valve 119 is opened, which permits the rotor 55 to force brake liquid out of the housing by flow through the channels provided between the tabs 94 and 95 on the stator vanes and, thence, into the annular passage 116a and through port 116 and passage 115 for discharge through the unloading conduit 118. By varying the volume of brake liquid in the brake unit 5, in the manner just described, any desired load may be imposed upon the engine of the vehicle being tested, the "closed" system making it easy to repeat various tests under any desired load conditions as often as neccessary, as explained more fully in my prior patent, supra.

While brake liquid is being admitted into or displaced from the working circuit to vary the load absorption capacity of the unit, air is correspondingly expelled from or admitted into the unit through the passages 93m and 130 in the air-bleed vanes 93-B and 93-C. Thus, no air pressure in excess of atmospheric pressure is built up in the working circuit to create pressure that would otherwise have to be overcome in order to add liquid to the working circuit. On the other hand, as brake liquid is removed from the working circuit to decrease the load, these same air-bleed pasageways let air into the vortex to avoid creating subatmospheric pressure conditions in the working circuit.

Trouble-free operation of the brake unit 5 is also assured through the bleeding of any free air that may be present in the brake liquid in the heat exchanger, through the holes 170 which communicate with the opening 172 in the plate 73 and with the passage 174 in the air-bleed vane 93-D. Such bleeding of air precludes the accumulation of any substantial bodies or slugs of air in the heat exchanger, which, upon return to the working circuit in lieu of an equal volume of liquid would result in erratic and unstable operation of the brake unit.

The tube 93n on the air-bleed vane 93-B acts to prevent brake liquid from finding its way into the air-bleed passage 93m as it splashes over the edge of the vane and flows down the lee face of the vane. Even though only small quantities of liquid flow in this fashion in the vortex area, it is of sufficient volume to often cause an undesirable wet air-bleed in this region of the stator, particularly when a vane is used which does not have its inner end blocked, as by the insert 93k. The tube 93n, therefore, provides for a dry air-bleed.

The brake unit 5 will rotate as a unit through an angle corresponding to the torque or horsepower being developed and the torque arm 181 will turn through a corresponding angle and actuate the torque bridge device 184 accordingly, which, in turn, will operate indicating means (not shown) to visually indicate the horsepower being developed, as is well understood by those familiar with the art.

The ability of the present "Junior" brake unit to absorb an unusually great amount of power for its size is based upon the special construction of the vanes of the rotor and stator members, which is such that the flow of the brake liquid will take a path substantially parallel with the direction or angle of the vanes at the critical time of passage of the brake liquid from one member to the other so that there will be substantially no shock or lateral impingement of the brake liquid against the sides of the vanes that will set up destructive vibrations and undersirable eddying.

In the present hydro-kinetic apparatus, a basic vane angle of 45 degrees is used for the reason that tests have demonstrated that such angle affords the best possibilities for maximum power absorption.

As the rotor starts to turn, the tangential velocity of the rotor changes the angle of the liquid leaving the rotor relative to the stator. In order to compensate for this change so that the liquid will enter the stator parallel to its vanes, either the acute angle between the rotor vane and the face of the rotor must be increased or the acute angle between the stator vane and the face of the stator must be decreased at the O. D., and vice versa at the I. D. By computing the vortex velocity at a normal rotor tangential velocity, this angular correction can be determined to obtain the desired direction of flow. In the present unit, instead of correcting the angle of the vanes on the receiving member, the angle of the vanes is corrected at the O. D. of the rotor, and at the I. D. of the stator; the portion of the stator vanes at the O. D. and the portion of the rotor vanes at the I. D. being disposed on an angle of 45 degrees to the torus faces, so that the liquid flowing from the corrected vane in the rotor will enter the stator on a corresponding angle of 45 degrees and vice versa. If desired, the necessary angle of correction may be divided equally between the rotor and stator vanes on opposite sides of the optimum basic vane angle, as will be shown hereinafter. Or, the correction can be made in the vane portion at the stator O. D. and in the vane portion at the rotor I. D.

The vortex velocity of the brake liquid is proportional to the R. P. M. of the rotor, and vortex velocities are substantially the same at a given speed regardless of the amount of brake liquid in the working circuit.

In the design of any hydro-kinetic unit, computations must be based upon given vortex velocities as well as given rotor R. P. M. and since the vortex velocities are influenced by the basic vane angle selected, as well as by frictional and transition losses, it will be obvious that the vane angles best suited to meet one condition will not necessarily be optimum for all conditions. The present brake unit is designed to absorb 125 horsepower at 1000 to 4000 R. P. M.

In order to obtain smooth operation with a minimum of shock or turbulence, it is necessary that:

(1) The brake liquid enter at the outer diameter (O. D.) of the stator pockets and the inner diameter (I. D.) of the rotor pockets, parallel to the vanes. In other words, the brake liquid must leave one member and enter the other member parallel to the vanes of the receiving member; and (2) There must be a uniform vane loading and a uniform change in direction of flow of the brake liquid in the pockets of both the rotor and stator.

Vanes disposed upon a basic angle of about 45 degrees provide for optimum power absorption in hydro-kinetic units. Since the pocket cross-section is influenced by vane thickness, the thinnest vanes practical for operating requirements and the maintenance of a maximum practical vortex velocity should be used.

An operative example will be set forth hereinafter for determining the rotor and stator vane angles and vane "correction" for uniform flow for a brake unit having predetermined dimensions. In order to facilitate understanding of such example, the various factors involved in the mathematical formulas discussed later will first be defined.

In a theoretically perfect flow pattern, a drop of water will flow in a circular path at the juncture line of the vane and torus from the hub to the outside diameter of the rotor torus where it then passes to the stator and follows the path of the vane-torus contact line to the stator hub, then back into the rotor. This is termed the vortex flow and its direction is illustrated by arrows in Fig. 32. In a unit full of brake liquid, an infinite number of flow lines can be drawn around the vortex center parallel to the vanes. Figure 32 diagrammatically illustrates a rotor 55 and stator 98 having 45 degree vanes 67 and 93, respectively, and wherein the direction of travel of the brake liquid is indicated by the arrows. Fig. 33 diagrammatically indicates, by velocity vectors $Vvr$, the velocity of the brake liquid on either side of the vortex center. The "vortex velocity" may be defined as the velocity of the brake liquid about the center of the vortex and parallel to the pressure side of the vane in any given pocket. It will be noted from the lengths of the vectors that the velocity is zero at the vortex center and increases from said center to the O. D. of the rotor 55 and also increases from said center to the I. D. of the stator 98.

Inasmuch as the rotation of the rotor 55 introduces a further factor, the speed of the rotor 55 relative to the stator 98 must be considered. Fig. 34 diagrammatically illustrates, by way of velocity vectors $Vrt$, the tangential velocity at various radially spaced points in the plane of the rotor face. The "tangential velocity" may be defined as the velocity of the brake liquid perpendicular to a line passing through the axis of the rotor and lying in a plane parallel to the face of the rotor. This velocity, obviously, is the same as the speed of the rotor since it represents the circumferential travel of the liquid from the time it enters the rotor at the I. D. and is discharged at the O. D. It is unaffected by the vortex velocity, but does increase the vortex velocity of the liquid entering the stator as will presently appear.

In all instances, the "vane angle" refers to the acute angle of the vane with respect to the face of the torus and in all cases it is the angle of the portions of the vane near the leading edge of the vane.

Inasmuch as the vortex velocity ($Vvr$) and the rotor tangential velocity ($Vrt$) both function to change the angle of the brake liquid entering the stator, the combining of the two results in the true or "absolute velocity" ($Vab$) of the brake liquid. Vectors corresponding to these velocities are identified by appropriate legends in Figs. 35 and 36. Furthermore, the vortex velocity has a tangential component indicated by the dotted lines T in Fig. 35, which combines with the rotor velocity in producing thrust forces acting on the pressure side of the vanes of the member receiving the liquid. Fig. 36 diagrammatically indicates the forces acting at the stator I. D. where the brake liquid flows from the stator back into the rotor. The tangential component of the vortex velocity at the stator I. D., of course, is opposite to that at the rotor O. D. or in a reverse spin.

In Fig. 37, the various vectors have been identified by the mathematical symbols corresponding thereto and which will be used in the various formulas discussed hereinafter.

In the operative example set forth hereinafter, the computations are based upon a rotor and stator having a cavity with an O. D. of 8⅜ inches, an I. D. of 2¼ inches and with the cross-section of the torus formed on a true radius of 1.531 inches. It will be noted that with a given vortex velocity, $Vvr$, the vortex velocity increase C entering the stator is equivalent to the rotor tangential velocity times the cosine of the angle B, which is the same as the vane angle B′. Thus, $C = Vrt \times \cos B'$.

For any selected basic vane angle, other than 90 degrees or 0 degrees, the total vortex velocity $Vvs$ will equal the sum of the vortex velocity plus the rotor velocity times the cosine of the angle B. Assuming a basic vane angle of 45 degrees, the above can be expressed by the formula:

$$Vvs = Vvr + (Vrt \times \cos 45°)$$

The cosine of 45 degrees is .707. If the vortex velocity is 150 ft./sec. at the O. D. at 1000 R. P. M. the O. D. rotor velocity at this speed is 36.5 ft./sec. Substituting in the above formula:

$$Vvs = 150 + (36.5 \times .707) = 178.5 \text{ ft./sec.}$$

A similar increase in vortex velocity will occur at the I. D. or stator hub. Thus, with a vortex velocity of 150 ft./sec. leaving the stator and a rotor tangential velocity of 9.75 ft./sec. at the I. D. (2.25″ dia.), the velocity of the liquid entering the rotor will be $150 + (9.75 \times .707)$ or about 157 ft./sec.

In a given brake unit, the vortex velocity should change in direct proportion to the rotor tangential velocity. This relationship has been established by tests to be correct by reason of the fact that at a constant load, the power increases as the cube of the rotor tangential velocity, within close limits. The above will also be apparent from Fig. 35 wherefrom it will be seen that if the vortex and absolute velocity vectors are projected as indicated in dotted lines, they will increase in direct proportion to each other and to the tangential velocity. Thus, if the rotor speed is doubled, the vortex velocity will be doubled and the absolute velocity will also be doubled.

In addition, the vortex velocity must remain constant regardless of the volume of liquid in the unit. Tests have demonstrated that with a constant speed, the angle of the flow lines does not change, except when the load is extremely light. Under this condition, the wetted surface in relation to the volume of water apparently became so great that the vortex velocity decreased, causing an angular change. Further observations indicated that no angular change occurred with a constant load and increase in speed.

Let us assume that (within reason) the vortex velocity varies in direct proportion to the rotor tangential velocity regardless of the rotor speed or load. On this basis a rotor speed of 1000 R. P. M. was chosen and the power that would result from various vortex velocities computed, using the formula:

$$E = \frac{WV_1^2}{2g} + \frac{WV_2^2}{2g}$$

which will determine the kinetic energy that will be absorbed by a given quantity of water during a given tangential velocity change of from $V_1$ to zero and zero to $V_2$, as will appear more fully hereinafter. Computations are based on a unit that is completely full of water.

There are several things that must be known or their effect on the computations evaluated:

A. Vortex flow pattern

Due to the unknowns in the exact flow of a partially full unit, a completely full unit is used for computations. Considering the vortex flow as a jet of water, the shape of its cross section as it leaves the rotor is that of the pocket opening between the vortex center and the O. D. Combining all the pockets, it becomes a rim of water with an I. D. at the vortex center and the O. D. at the rotor O. D. At the hub, the rim of water entering the rotor has an I. D. equal to the torus I. D. and an O. D. at the vortex center line.

B. To simplify computations, it is necessary to know if the mean vortex velocity of the water entering the rotor is the same as that leaving the rotor. Actually it is known that this is not true. Friction losses in the stator will result in a lesser vortex velocity at the hub than when it entered at the O. D. and that the water is accelerated in the rotor giving a somewhat greater vortex velocity at the O. D. However, it is known that the volume of water per minute that leaves the rotor is the same as that which enters at the hub. Now, if the cross-sectional area between the vortex center and the hub is equal to the area between the vortex center and the O. D. the mean velocity entering and leaving the rotor are the same.

It was determined experimentally that the vortex center of the present unit lies on a circle having a diameter of 6.12 inches, as diagrammatically shown in Fig. 34. This gives an area on the face of the torus of 25.623 square inches between the vortex center and O. D. and 25.489 square inches between vortex center and hub or I. D. Hence, the area of the pocket portions $p$ and $p'$ on opposite sides of the vortex center line is substantially equal.

Having determined the location of the vortex center, let us consider the theoretical shape of the liquid mass, which may be likened to a flywheel rim, being extruded from the rotor between the vortex center and O. D., and then determine the radius of gyration of this mass or rim. Considering only the vortex center to O. D., a cross section of the shape of the vortex velocity distribution graph at the rim is generally triangular, as shown at F in Fig. 38. This is not an exact shape, but is fairly close. The shape will vary from the lee side to the pressure side of each pocket so the triangular rim is used as a practical comprise. To determine the radius of gyration of this triangular rim about the rotor axis BB, the following formulas from Hudson's Engineer's Manual will be used:

$$J \text{ about } AA = \frac{bh^3}{36} \quad \text{(Page 80)}$$

$$K \text{ about } BB = \sqrt{\frac{JBB}{A}} \quad \text{(Page 433)}$$

$$JBB = JAA + AX^2 \quad \text{(Page 432)}$$

where:
$J$=Moment of inertia
$K$=Radius of gyration
$AA$=Axis J of triangle rim cross section F
$BB$=Axis of rotor shaft
$A$=Area of triangular rim cross section F
$b$=Base of section
$h$=Height of section (vortex center to O. D.)
$y$=Distance of $h$ from BB
$X$=Moment of inertia of area A about $$BB = y + \frac{2h}{3}$$

Therefore:

$$KBB = \sqrt{\frac{JAA + Ax^2}{A}}$$

$$= \frac{\sqrt{\frac{bh^3}{36} + 1/2 bhx^2}}{1/2 bh}$$

$$= \frac{\sqrt{\frac{h^2}{36} + \frac{x^2}{2}}}{1/2}$$

$$= \sqrt{\frac{h^2}{18} + x^2}$$

Also:

$$x = y + \frac{2h}{3}$$

$$= 3.06 + .747$$

$$= 3.807$$

Therefore:

$$KBB = \sqrt{\frac{1.12^2}{18} + 3.807^2}$$

$$= \sqrt{.0698 + 14.50}$$

$$= \sqrt{14.5698}$$

$$= 3.835 \text{ in. radius of gyration}$$

This will be used in later computations.

The relationship between vortex velocity and gallons of water per minute circulated, must now be established. With an area on the face of the torus of 25.623 sq. in. between the vortex center and O. D., the total cross-sectional area of all pockets (an area computed perpendicular to the basic plane of the vanes) from the vortex center to the O. D. is .707×25.623 or 18.13 sq. in. (with the vanes set at 45 degrees the cross section of each pocket is .707 times the cross section area of the pocket if vanes were set at 90 degrees). Using vanes 1/16 inch thick, the area of the leading edge of each rotor vane from the vortex center to the O. D. is .062×1.125 or a total of 1.465 sq. in. for 21 vanes, leaving a total area of 18.13−1.465 or 16.665 sq. in.

In the formula:

$$\text{Velocity in ft./sec.} = \frac{.32083 \times \text{G. P. M.}}{\text{area}}$$

Substituting for area:

$$Vvr \text{ in ft./sec.} = \frac{.32083 \times \text{G. P. M.}}{16.665} = .01925 \times \text{G. P. M.}$$

$Vrt$, the resulting tangential velocity=.707×vortex velocity, so that the tangential velocity in ft./sec. resulting from the vortex velocity=

$$.707 \times .01925 \times \text{G. P. M.} = .01361 \times \text{G. P. M.}$$

We have now established the following:
The radius of gyration is 3.835 inches. Therefore, at 1000 R. P. M., the rotor tangential velocity at this radius in ft./sec. is $$\frac{\pi D}{12} \times \frac{1000}{60} = 33.5$$

The mean tangential velocity of the water due to the mean vortex velocity is .01361×G. P. M.

The formula for determining kinetic energy from vortex velocity is:

$$\overset{\text{(O. D.)}}{E} = \frac{WV_1^2}{2g} + \overset{\text{(Hub)}}{\frac{WV_2^2}{2g}}$$

$W$=Weight of fluid per minute
$g$=Acceleration due to gravity=32.16
$Vv$=Mean vortex velocity
$Vvt$=Mean tangential velocity due to vortex velocity
$Vr$=Rotor tangential velocity at radius of gyration of effective flywheel rim.
$E$=Kinetic energy in foot pounds per minute Substituting appropriate velocity symbols in the formula we have:

$$E = \frac{W(Vr+Vvt)^2}{64.32} + \frac{W(Vvt)^2}{64.32}$$

$$= W\left[\frac{(Vr+Vvt)^2 + (Vvt)^2}{64.32}\right]$$

for any unit with any fluid.

It should also be borne in mind that,

1 H. P. = 33,000 ft. lb./min.

$$\therefore H.P. = W\left[\frac{(Vr+Vvt)^2 + (Vvt)^2}{64.32 \times 33,000}\right]$$

It has been determined hereinbefore that, on an 8⅜ inch O. D. rotor using water, the factors for this formula are:

$W = 8.33 \times$ G. P. M: (weight of gallon of water)
$Vv = .01925 \times$ G. P. M.
$Vvt = .01361 \times$ G. P. M. $= .707 \times Vv$
$Vr = 33.5$ ft./sec.

It can also be seen from the formula $Vv = .01925 \times$ G. P. M. that $$G.\ P.\ M. = \frac{Vv}{.01925}$$

By substituting in:

$$E = W\left[\frac{(Vr+Vvt)^2 + (Vvt)^2}{64.32}\right]$$

We get:

$$E = \frac{8.33 \times \frac{Vv}{.01925}[(33.5 + .707\ Vv)^2 + (.707\ Vv)^2]}{64.32}$$

$$= \frac{432.7\ Vv[(33.5 + .707\ Vv)^2 + (.707\ Vv)^2]}{64.32}$$

$$= 6.727\ Vv[(33.5 + .707\ Vv)^2 + (.707\ Vv)^2]$$

To solve for H. P. divide the answer by 33,000.

Examples with different vortex velocities:

$Vv$ = mean vortex velocity = 100 ft./sec.
$E = 672.7\ [(33.5+70.7)^2 + (70.7)^2]$
$= 672.7\ (10,858 + 5000)$
$= 672.7\ (15,858)$
$= 10,750,108$ ft. lb./min. $= 325$ H. P.

$Vv = 70$ ft./sec.
$E = [471\ (33.5+49.5)^2 + (49.5)^2]$
$= 471\ (6890 + 2450)$
$= 471 \times 9340$
$= 4,395,000$ ft. lb. $= 133$ H. P.

$Vv = 80$ ft./sec.
$E = 538\ [(33.5+56.5)^2 + (56.5)^2]$
$= 538\ (8,100 + 3195)$
$= 538\ (11,295)$
$= 6,070,000$ ft. lb. $= 184$ H. P.

$Vv = 90$ ft./sec.
$E = 606\ [(33.5+63.6)^2 + (63.6)^2]$
$= 606\ (9450 + 4,040)$
$= 606\ (13,490)$
$= 8,170,000$ ft. lb. $= 247.5$ H. P.

$Vv = 60$ ft./sec.
$E = 404\ [(33.5+42.4)^2 + (42.4)^2]$
$= 404\ (5,750 + 1,800)$
$= 404\ (7550)$
$= 3,055,000$ ft. lb. $= 92.5$ H. P.

In the graph constituting Fig. 40, the above mean vortex velocities have been plotted as ordinates and the horsepower as abscissas. It will be noted from the graph that a unit which will absorb approximately 150 horsepower at 1000 R. P. M. has a mean vortex velocity of approximately 75 ft./sec. or a maximum vortex velocity at the O. D. of 150 ft./sec. with zero at the vortex center. Therefore, at 1000 R. P. M. the rotor tangential velocity at the O. D. (8⅜ inch) is 36.5 ft./sec.

$$\frac{\pi D}{12} \times \frac{R.\ P.\ M.}{60} = \frac{3.14 \times 8.375}{12} \times \frac{1000}{60}$$

and a vortex velocity of 150 ft./sec. At the hub (2¼ inch), the rotor tangential velocity is 9.8 ft./sec.

$$\left(\frac{3.14 \times 2.25}{12} \times \frac{1000}{50}\right)$$

with a vortex velocity of 150 ft./sec.

Assuming a stator vane angle of 45 degrees at the O. D., it will be apparent from Fig. 41 that, if the vortex velocity and the rotor tangential velocity are known, the angle of the vortex velocity $x$ (extreme O. D. vane angle of rotor) can be determined by solving for the angle $B''$, using the formula:

$$\sin B'' = \frac{\sin A(45°) \times Vrt}{Vvr}$$

$$\sin B'' = \frac{.707 \times 36.5}{150} = .172$$

$$B'' = 9° - 54'$$

Accordingly, the rotor vane angle of the vane portion 67c at the O. D. of the leading edge of the vane 67 should be 45°+9°—54' or 54°—54', or almost 10° greater than the angle of its confronting stator vane portion 93r, as diagrammatically illustrated in Fig. 43. In production, the rotor O. D. vane angle could be 54 degrees to 55 degrees and the stator O. D. vane angle set at 44 degrees to 45 degrees, to provide necessary tolerances in manufacture. Tests indicate that a differential of 6 degrees to 11 degrees between the rotor and stator vane angles at the O. D. is feasible, although an angle difference of about 10 degrees, which closely approximates the theoretical angle, is preferred. From a hydraulic standpoint, it is theoretically better to over-correct (increase the difference in vane angles) than to under-correct. Thus, the exit angle of the rotor pockets at the O. D. may be 6 to 11 degrees greater than the entrance angle of the stator pockets.

Correction at points closer to the vortex center obviously should be much greater than at the O. D. inasmuch as the vortex velocity decreases at a far greater rate than the rotor tangential velocity. For example, at 7¹³⁄₁₆ inches diameter, the vortex velocity would be approximately 75 ft./sec. (about half that at the O. D.) while the rotor tangential velocity has only been reduced from 36.5 to 34.1 ft./sec. This would result in a rotor vane angle of 18°—43'+45° or 63°—43'. Obviously such a correction is limited by construction considerations and a practical compromise is used and will be explained later.

Referring to Fig. 42, the hub or I. D. stator correction can be made in a manner similar to that of the rotor O. D., supra. Again, assuming a 45 degree vane portion at the rotor I. D., the same vortex velocity and a rotor I. D. tangential velocity of 9.75'/sec., $$\left(\frac{3.14 \times 2.25}{12} \times \frac{1000}{60}\right)$$

the angle $Bs =$ $$\sin Bs = \frac{\sin A \times Vrt}{Vvr}$$

$$\sin Bs = \frac{.707 \times 9.75}{150} = .0458$$

$$Bs = 2° - 41'$$

Accordingly, the stator vane portion 93q should have an angle at the I. D. of 2°—41'+45°=47°—41', as shown in Fig. 44. As in the case of the O. D. it is practical to establish the desired theoretical angle tolerance at 47 degrees to 48 degrees for the portion 93q of the stator vane at the I. D. and 44 degrees to 45 degrees at the rotor I. D. The desired theoretic difference is 2°—41', but here again experiments indicate that it is practical to allow a tolerance in vane angle differences at the hub or I. D. of from 2 degrees to 5 degrees, and a difference of 3 degrees is the preferred angle. Thus, the exit angle of the stator pockets at the I. D. may be 2 degrees to 5 degrees greater than the entrance angle of the rotor pockets. As in the case of the angles at the O. D. to the vortex center, the angular correction (difference in angle between rotor and stator vanes) from the hub to the vortex center should theoretically become greater. Obviously the vortex velocity decreases as it reaches vortex center, yet the rotor velocity increases from the hub toward the vortex center. Operational and constructive limitations restrict the amount of increase in angular difference that is practical.

Theoretically, the vane angle correction should be split between the rotor and stator on either side of the theoretical optimum basic angle. The method of correction is the same. If a vane angle differential of 8 degrees between rotor exit angle and stator entrance angle is desired, for example, and the 45 degree basic angle is used as the optimum, the rotor vane portion 67c at the O. D. should be disposed on an angle of 49 degrees and the corresponding stator vane portion 93r on an angle of 41 degrees, as illustrated in Fig. 45. If a vane angle differential of 3 degrees between rotor entrance angle and stator exit angle is desired at the I. D., the same may be incorporated by disposing the rotor vane portions 67d on an acute angle of 43½ degrees to the face of the rotor and the stator vane portions 93q on an acute angle of 46½ degrees to the face of the stator, as illustrated in Fig. 46. The same method of application of the principles disclosed herein applies regardless of the basic vane angle used.

Figs. 47 and 48 diagrammatically illustrate theoretical leading edge vane angle corrections, including the angular correction at the offset portions 67e of the rotor vanes 67 and the offset portions 93t of the stator vanes 93. It will be noted that the inner portion of the offsets 67e and 93t lie on a diameter of 5⅝ inches, whereas the outer portion of said offsets lie on a diameter of 6⅝ inches.

Figs. 49 and 50 are similar to Figs. 47 and 48 but diagrammatically illustrate the corresponding angles used on an experimental unit that was found to be satisfactory. It will be noted that the angle of the vane portions adjacent the vortex center depart substantially from the theoretical angles indicated in Figs. 47 and 48, and this change is a necessary compromise because of practical considerations in the fabrication of the rotor and stator vanes, but nevertheless results in a successful unit.

The principles of vane construction disclosed herein take into consideration the flow of the liquid at the surface of the vanes at the time that the pressure side of a rotor and stator vane have their leading edges on the same torus diameter. Actually, this is the only time that vanes of equal angle in the rotor and stator can be considered parallel to each other. However, considering a rotor vane passing across a complete pocket of the stator, the average flow of liquid leaving the rotor vane is parallel to the center line of the pocket in the stator and is parallel to the pressure side of the stator vane at the time of greatest force.

The compromise which must be made in the vane angle correction at the O. D. of the rotor and the I. D. of the stator may at first appear to be a serious obstacle to the present concept of vane angular correction, but such is not the case. The angular corrections are made largely to reduce vane loading. The greatest loads or shocks occur at or near the O. D. and I. D. and become progressively less as the vortex center is approached, due to the reduction in vortex velocities as the vortex center is reached. In a small brake unit of the size disclosed herein, the prescribed vane angles need only extend along the faces of the vanes for about ¼ inch to ½ inch from both the O. D. and the I. D.

If a flat vane disposed on an angle of 45 degrees were employed, a drop of water traveling around the vortex line between the torus and vane would not experience a uniform tangential velocity change for the reason that the vane-torus contact curve does not change uniformly. Therefore, the force against the vane will not be uniform. To obtain a uniform force due to vortex velocity, the path of the liquid, when viewed perpendicular to the plane of the vane, should be circular. Fig. 39 constitutes a graph (determined by lay-out) wherein the relative tangential velocity change from the I. D. to the O. D. is shown as a solid line plotted against twenty equal divisions along the vane-torus contact line. This solid line clearly indicates the severe direction changes which occur, particularly near the hub. It will be noted that as much as 26½% of the total tangential velocity change occurs in 10% of the distance that the water travels around the line of vane-torus contact. The dotted line indicates the desired uniform tangential velocity change at equal increments around the vane-torus contact line.

In order to obtain uniform vane loading and uniform velocity change, the vanes of the present brake unit have been "compromised" by suitably dishing or curving the same to provide a contour conforming as nearly as possible to the theoretical contour they should have as determined by known methods of geometrical projection, and at the same time provide the straight vane edges 67a on the rotor vanes 67 and a", a and a' on the stator vanes 93 and 93–A to 93–B adapted to be received in the readily milled straight grooves 66 and 92, respectively. Thus, each rotor vane 67 is curved to provide a depression 67f (Figs. 27, 30 and 31) on the pressure side thereof which establishes a flow line more than half-way around the vane and increases in depth inwardly of the leading edge 67b toward the straight edge 67a with a maximum depth of approximately ⅛ inch and a very abrupt change in curvature adjacent the straight edge 67a, as best shown in Fig. 31. The depression 67f also increases in depth from the I. D. to the O. D. in the region thereof remote from the leading edge 67b.

Similarly, each stator vane 93 and 93–A to 93–D is curved to provide a depression 93u (Figs. 16 to 19 and 24 and 25) on the pressure side thereof, which establishes a flow line more than half-way around the vane and increases in depth inwardly of the leading edge 93s toward the straight edge a" of the vanes 93 and edges a, a' of the vanes 93–A to 93–D, with a maximum depth of approximately 3/16 inch and a very abrupt change in curvature adjacent said straight edges. The depression 93u also increases in depth in a direction from the I. D. to the O. D. in the region thereof remote from the leading edge 93s.

In this manner, smooth operation of the brake unit is attained without objectionable turbulence, destructive vibration, shock or vane erosion.

Fig. 3 diagrammatically illustrates a hydro-kinetic brake unit 5A applied to a shaft 18A extending completely through the unit. The shaft may be a vehicle propeller shaft, or any other shaft whose rotation it is desired to retard to reduce its speed. It will be understood that the housing member 73A may be fixed to any convenient part of a vehicle (not shown), when the unit is used as a vehicle brake, to prevent rotation thereof and that a braking effect is exerted upon the shaft by the action of the brake liquid between the rotor 55A and stator 98A. A tank 190 serves as a storage means for the brake liquid and may be of small size since the volumetric capacity of the "junior" brake unit is quite small. The tank 190 is connected by a supply conduit 191 with the inlet of the brake unit 5A and a valve 192 is connected in said conduit to control the flow of liquid from the tank 190 to said brake unit. A return conduit 193 is provided for effecting the return of brake liquid from the brake unit 5A to the tank 190 to reduce the braking effect on the shaft 18A. A valve 194 is connected in the return conduit 193 for controlling the discharge of brake liquid from the brake unit 5A. The valves 192 and 194 are preferably of the conventional, solenoid remote-control type (similar to valves 111 and 119) and are arranged to be selectively operable at the will of the driver of the vehicle to effect application and release of retarding force to the shaft 18A. When a braking effect is no longer desired, the valve 194 in the return line 193 is opened and the unit 5A automatically empties itself, the rotor 55A acting as an impeller and forcing the brake liquid back into the tank 190.

A pump 195, which may be of any suitable or conventional construction, is arranged to be continuously driven by the shaft 18A when the vehicle is in motion. The pump 195 has the inlet end thereof connected by a conduit 196 with the lower end of an air-cooled radiator 197 adapted to contain a coolant for circulation through the heat exchanger 140A of the brake unit 5A to effect cooling of the brake liquid while it is traveling in the closed system of the brake unit. The discharge end of the pump 195 is connected by a conduit 198 to the inlet of the header 148A associated with the heat exchanger 140A and the outlet of said header is connected by a conduit 199 with the upper end of the radiator 197 for returning the coolant to said radiator. The radiator 197 may consist of the vehicle cooling radiator or may be in the form of an auxiliary air-cooled radiator serving the sole purpose of cooling the brake liquid.

The system, as above described, provides for continuous circulation of coolant through the heat exchanger 140A. However, it is preferable to conserve the power required to drive the pump 195 when coolant flow is not required. To this end a valve 200, similar to the valves 192 and 194, may be connected in the supply line 196 and operated by the driver so that the supply of coolant to the heat exchanger 140A can be interrupted. The pump 195 will then run idle and require but little power to drive the same.

It will be understood that the operator can adjust the valves 192 and 194 so that the brake unit is either partially or completely filled with brake liquid, depending upon the retarding force which it is desired to apply to the shaft 18A.

The maximum overall dimensions of the brake units 5 and 5A are 13½ inches long, and this includes the heat exchanger 140; 9½ inches diameter, considered vertically; and a width of 11½ inches horizontally. The capacity of the unit, notwithstanding its extreme small or "junior" size is 125 horsepower at 1000 to 4000 R. P. M. with a requirement, by the brake unit 5 of only 4½ gallons of cooling water per horsepower per hour. Equally remarkable is the fact that the present brake unit with its single working circuit has a power absorption capacity approximately equal to that of a commercial 18-inch unit having two working circuits constructed in accordance with my prior patent, supra. This is attributable to the special configuration, and angular disposition, of the rotor and stator vanes disclosed herein and in my co-pending application, supra.

It will be understood that the principles of construction and flow behavior disclosed herein in connection with the shape of the vanes and rotor and stator members, their angular disposition in said members, etc., in connection with hydro-kinetic brake or power absorption devices, are equally applicable to hydro-kinetic power transmission devices, such as fluid couplings and torque converters.

It will also be understood that the vanes and pockets of the rotor 55 and stator 98 may be disposed in an opposite direction from that disclosed herein to meet requirements where the rotor must turn in the opposite direction.

It will be further understood that minor changes may be made in the details of construction of the brake unit and the rotor and stator elements thereof without departing from the principles of the invention or the scope of the annexed claims.

I claim:

1. In a hydro-kinetic device, a rotor member and a stator member each having vanes confronting each other in a plane perpendicular to the axis of the rotor with portions of respective of said vanes disposed on different predetermined angles relative to a given basic angle to provide an exit angle for brake liquid on one of said members which is substantially equal to the vane entrance angle on the other member, and in which the exit angle for brake liquid on said other member is substantially equal to the vane entrance angle of said one member.

2. In a hydro-kinetic device, a hollow torus member, said member having a series of circumferentially spaced grooves formed in the interior thereof on a given acute angle to the plane of the inner face of said member; and a vane mounted in each of said grooves with its leading edge lying in the same general plane as the face of said member, one end portion of said vanes being disposed on an acute angle greater than about 45 degrees to said face and the other end portion of said vanes being disposed on an acute angle not greater than about 45 degrees to said face.

3. In a hydro-kinetic device, a rotor member and a stator member each provided with vanes forming confronting pockets, the vanes on one of said members having portions disposed on different angles from that of the portions of the vanes of the other member confronting the same, each of the pockets on said rotor and stator members having an exit angle and an entrance angle, the exit angle of the pockets on one of said members being about 6 to 11 degrees greater than the entrance angle of the pockets of the other member, and the exit angle of the pockets of said other member being about 2 to 5 degrees greater than the entrance angle of the pockets of said one member.

4. In a hydro-kinetic device, a rotor member and a stator member each provided with vanes forming confronting pockets, the vanes on one of said members having portions disposed on different angles from that of the portions of the vanes of the other member confronting the same, each of the pockets on said rotor and stator members having an exit angle and an entrance angle, the exit angle of the pockets on one of said members and the entrance angle of the pockets of the other member having a differential angle of about 8 degrees, and the exit angle of the pockets of the other member and the entrance angle of the pockets of said one member having a differential angle of about 3 degrees.

5. In a hydro-kinetic device, a rotor and a stator, each provided with vanes forming confronting pockets therein each of said pockets having an entrance angle and an exit angle, the vanes in said rotor having portions disposed on different acute angles from that of the portions of the stator vanes confronting said rotor vanes, the acute exit angle of the rotor pockets being about 6 to 11 degrees greater to the plane of the face of said rotor than the acute entrance angle of the stator pockets and the acute exit angle of the stator pockets being about 2 to 5 degrees greater to the plane of the face of said stator than the acute entrance angle of said rotor pockets.

6. A device as defined in claim 5 in which the exit angle of the rotor pockets is about 9°–54' greater than the entrance angle of the stator pockets.

7. A device as defined in claim 5 in which the exit angle of the stator is about 2°–41' greater than the entrance angle of the rotor pockets.

8. In a hydro-kinetic device, a stator having vanes disposed therein with one edge of said vanes lying in the same general plane as the face of said stator, the outer portion of said vanes being disposed on an angle of about 44 to 45 degrees to the face of said stator, and the inner portions of said vanes being disposed on an angle of about 47 to 48 degrees to the face of said stator.

9. In a hydro-kinetic device, a rotor having a plurality of vanes disposed therein with one edge of said vanes lying in the same general plane as the face of said rotor, the outer portions of said vanes being disposed on an angle of about 54 to 55 degrees to the plane of the face of said rotor, and the inner portions of said vanes being disposed on an angle of about 44 to 45 degrees to the face of said rotor.

10. In a hydro-kinetic device, in a combination: a rotor having a plurality of vanes disposed therein with one edge of said vanes lying in the same general plane as the face of said rotor, the outer portions of said vanes being disposed on an angle of about 54 to 55 degrees to the plane of the face of said rotor, and the inner portions of said vanes being disposed on an angle of about 44 to 45 degrees to the face of said rotor; and a stator having vanes disposed therein with one edge of said vanes lying in the same general plane as the face of said stator, the outer portion of said vanes being disposed on an angle of about 44 to 45 degrees to the plane of the face of said stator, and the inner portions of said vanes being disposed on an angle of about 47 to 48 degrees to the face of said rotor.

11. In a hydro-kinetic device, a rotor having a plurality of vanes disposed therein with the leading edge of said vanes lying in the same general plane as the face of said rotor and having an offset formed therein intermediate the ends thereof, the portions of said vanes located outwardly of said offset being disposed on an acute angle of about 6 to 12 degrees greater to the plane of the face of said rotor than the portions of said vanes located inwardly of said offset; and a stator having vanes disposed therein with the leading edge of said stator vanes lying in the same general plane as the face of said stator and having an offset formed therein intermediate the ends thereof, the portion of said stator vanes located outwardly of the offset therein being disposed on an acute angle of about 2 to 8 degrees greater to the plane of the face of said stator than the portions of said stator vanes located inwardly of the offset therein.

12. A vane for a hydro-kinetic device, comprising: a body having a continuous leading edge adapted to be disposed at the face of a torus member, and having other edge portions of a contour to fit a torus of predetermined cross-sectional shape, said leading edge having a substantially straight offset therein spaced from its ends, and said body having portions on either side of said offset extending away from said leading edge on different angles.

13. A vane as defined in claim 12, in which the angular difference between the vane portions extending inwardly from the leading edge of the vane is 6 to 12 degrees.

14. A vane as defined in claim 12, in which the angular difference between the vane portions extending inwardly from the leading edge of the vane is 2 to 8 degrees.

15. A vane as defined in claim 12, in which a depression is formed in the body of the vane inwardly of the leading edge of the vane and which depression increases in depth in a direction away from said leading edge.

16. A laminated vane for use in hydro-kinetic apparatus, comprising: a pair of elongated plates of predetermined marginal contour; a pair of core pieces between said plates having a marginal contour corresponding generally to that of said plates but projecting slightly beyond the margin of said plates, said core pieces having their adjacent ends disposed transversely of said plates and spaced apart longitudinal of said plates to provide a transverse passage extending through said vane.

17. A laminated vane for use in hydro-kinetic apparatus, comprising: a pair of elongated plates of predetermined contour; a pair of core pieces between said plates, said core pieces having their adjacent ends disposed transversely of said plates and spaced apart longitudinal of said plates to provide a transverse passage in said vane; means obstructing one end of said passage; and one of said plates having a tube thereon and having an opening establishing communication between said tube and said transverse passage.

18. A laminated vane for use in hydro-kinetic apparatus, comprising: a pair of elongated plates of predetermined contour; and a pair of core pieces between said plates having a marginal contour corresponding generally to that of said plates, said core pieces having their adjacent ends disposed transversely of said plates and spaced apart longitudinally with respect to said plates to provide a transverse passage extending through the vane, each of said core pieces having a tab forming an extension of said core pieces and of said passage, and each of said plates having a tab overlying the tabs of said core pieces.

19. In a hydro-kinetic device, a housing; a separate annular stator member disposed within said housing, said housing having an end wall; and a shaft extending through said end wall into said housing and through said stator member, including a portion abutting said end wall and said stator member having an inner diameter greater than that of the diameter of said shaft, whereby an annular chamber is provided between said shaft and stator member, said housing end wall having a fluid inlet opening communicating with said chamber.

20. A hydro-kinetic device, comprising: a housing; a stator member of smaller diameter than said housing disposed in said housing, and providing an annular clearance space between said housing and stator member; and a plurality of vanes mounted in said stator member, each vane having a tab projecting beyond the periphery of said stator member into said clearance space and serving as a guide vane for liquid entering said clearance space, said housing having an outlet opening in communication with said clearance space.

21. In a hydro-kinetic device, a stator plate; a substantially semi-toroidal stator member mounted upon said plate; a member surrounding said stator member and cooperating with said stator plate to form a housing enclosing said stator member, said stator member having a boss forming with said stator plate and housing member, annular chambers at the inner and outer margins of said stator member, said stator plate having an opening communicating with the chamber at the outer margin of said stator member and having another opening communicating with the chamber at the inner margin of said stator member.

22. In a hydro-kinetic device, a substantially flat stator plate; an annular stator member having an annular cavity formed in one side thereof and having an annular boss on the opposite side thereof engaged with said stator plate; a housing member surrounding said stator member in spaced relation thereto and cooperating with said boss to provide a chamber surrounding the exterior of said stator member, said stator plate having an opening communicating with said chamber; a shaft extending through said stator plate on said stator member; and a rotor mounted upon said shaft, said shaft cooperating with said boss to provide a second chamber disposed between said shaft and said boss, said stator plate having a second opening communicating with said second chamber.

23. In a hydro-kinetic device, a housing; an annular stator member in said housing; a shaft extending into said housing and through said stator member, said stator member having an inner diameter greater than that of the diameter of said shaft, whereby an annular chamber is provided between said shaft and stator member, said housing having an inlet opening communicating with said chamber, said stator member also being of smaller diameter than said housing to provide an annular clearance space between said housing and stator member; and a plurality of vanes mounted in said stator member, each vane having a tab projecting beyond the periphery of said stator member into said clearance space, said housing having an outlet opening in communication with said clearance space.

24. A hydro-kinetic device, comprising: a housing; a stator member of smaller diameter than said housing disposed in said housing, and providing an annular clearance space between said housing and stator member; a plurality of vanes mounted in said stator member, each vane having a tab projecting beyond the periphery of said stator member into said clearance space, said housing having an outlet opening in communication with said clearance space; and a dam member exterior of said stator member and disposed in said clearance space for retarding circumferential circulation of brake liquid in said clearance space and arranged to direct brake liquid into said opening.

25. A hydro-kinetic device comprising: a stator housing; a shaft extending into said housing; a vaned rotor on said shaft; a stator member of smaller diameter than said housing disposed in said housing in surrounding relation to said shaft and cooperating with said housing to form an annular chamber for brake liquid surrounding the exterior of said stator member; a plurality of vanes in said stator member, each of said vanes having a tab projecting beyond the periphery of said stator and into said chamber and disposed at an angle to the plane of said stator, said housing having a discharge port in communication with said chamber; a dam member mounted on the exterior of said stator member and forming a continuation of one of said tabs, said dam being positioned to direct the brake liquid to discharge through said discharge opening; said stator member having an inner diameter greater than that of the diameter of said shaft, whereby an annular chamber is formed between said shaft and said stator member, said housing having an inlet opening communicating with said last mentioned chamber.

26. In a hydro-kinetic device, a stator plate; an annular stator member carried by said stator plate on one side thereof; a ring of greater diameter than said stator member fixed to said one side of said stator plate in concentric spaced relation to said stator member; a shaft extending through said stator plate and stator member; a rotor mounted upon said shaft in confronting relation to said stator member; and a housing enclosing said rotor and stator members and having a portion thereof engaged with said ring member for positioning the same in concentric relation with said rotor and stator members.

27. In a hydro-kinetic device, a rotor member having a plurality of vanes disposed therein, and pockets between adjacent vanes, at least the outer portions of said rotor pockets being flared to enlarge said pockets; and a stator having vanes and pockets disposed in confronting relation to the vanes and pockets of said rotor, at least the outer edge of said stator being chamfered on an angle generarlly parallel with the flared portions of said rotor pockets.

28. In a hydro-kinetic device, a rotor member having a plurality of vanes disposed therein, and pockets between adjacent vanes, portions of said rotor being flared at the inner and outer margins thereof to enlarge said pockets at the exit and entrance thereto; and a stator having vanes and arcuate pockets disposed in confronting relation to the vanes and pockets of said rotor, the pockets of said rotor and stator cooperating to provide a working circuit for brake liquid, the inner and outer marginal edges of said stator being chamfered on an angle to lie generally parallel with the flared portions of said rotor pockets.

29. Hydro-kinetic apparatus, comprising: a brake unit including a stator plate having an inlet opening and an outlet opening communicating with the interior of said brake unit; an annular heat exchanger arranged coaxially with said brake unit adjacent said stator plate, said stator plate having inlet and outlet ports establishing communication between said brake unit and said heat exchanger; a header plate disposed adjacent the opposite end of said heat exchanger and having an inlet and an outlet for a coolant; and tie bolts interconnecting said stator plate and header plate to clamp said heat exchanger therebetween.

30. Hydro-kinetic brake apparatus, comprising: a hydro-kinetic brake unit, including a stator housing, a rotor in said housing, and a shaft extending through said housing connected with said rotor; a storage tank for brake liquid; conduit means connecting said storage tank with said brake unit for inter-flow of brake liquid from said storage tank to said stator housing and for return flow from said stator housing to said storage tank; control means connected in said conduit means for controling the aforesaid inter-flow of brake liquid; a heat exchanger having an inlet and an outlet; means independent of said conduit means establishing communication between said brake unit and said heat exchanger for effecting cooling of said brake liquid; a pump driven by said shaft, said pump having an inlet and an outlet; a radiator; conduit means connecting said radiator with the inlet of said pump; conduit means connecting the outlet of said pump with the inlet of said heat exchanger; and conduit means connecting the outlet of said heat exchanger with said radiator.

31. A vane as defined in claim 12, in which the edge portions of the vane, other than its leading edge, define a substantially straight line.

32. A laminated vane for use in hydro-kinetic apparatus, comprising; a pair of elongated plates of predetermined contour; and a pair of core pieces between said plates, said core pieces having their adjacent ends disposed transversely of said plates and spaced apart longitudinally of said plates to provide a transverse passage in said vane.

33. A hydro-kinetic device, comprising: a housing; a stator member of smaller diameter than said housing disposed in said housing, and providing an annular clearance space between said housing and stator member; a plurality of vanes mounted in said stator member, said housing having an outlet opening in communication with said clearance space; and a dam member exterior of said stator member and disposed in said clearance space for retarding circumferential circulation of brake liquid in said clearance space and arranged to direct brake liquid into said opening.

34. In a hydro-kinetic device, a stator comprising: a torus member having an inner face and being substantially semi-circular in radial cross-section; and a plurality of vanes in said torus dividing the same into a plurality of pockets, said vanes having a portion angularly disposed with respect to the torus face to provide an entrance angle to said pockets of about 44 to 45 degrees, and having another portion angularly disposed to said torus face to provide an exit angle from said pockets of about 47 to 48 degrees.

35. Hydro-kinetic apparatus, comprising: a brake unit including a rotor, a stator, a housing enclosing said rotor and stator and a stator plate having an inlet opening and an outlet opening for brake liquid communicating with the interior of said housing; an annular heat exchanger arranged coaxially with said brake unit adjacent one side of said stator plate, said stator plate having inlet and outlet ports establishing communication between said housing and said heat exchanger; a header plate disposed adjacent the opposite end of said heat exchanger and having an inlet and an outlet for a coolant for said heat exchanger, said housing having flange means on the opposite side of said stator plate; and tie bolts extending through said flange means, stator plate and header plate for securing the same together with said heat exchanger clamped between said stator plate and header plate.

36. A hydro-kinetic device, comprising: a stator plate; a vaned annular stator member mounted upon said stator plate; a ring mounted upon said stator plate in spaced concentric relation to said stator member; a shaft extending through said stator plate and stator member; a vaned rotor mounted upon said shaft in confronting relation to said stator; a cover member enclosing said stator and rotor members and including a cylindrical portion engaged with said ring; a flange carried by said cylindrical portion and engaged with said stator plate; and means securing said flange to said stator plate.

37. A hydro-kinetic device as defined in claim 1, in which the vanes of the rotor and stator members are curved to provide a substantially uniform change of direction of flow of the brake liquid relative thereto.

38. A hydro-kinetic device as defined in claim 1, in which the vanes of the rotor and stator have entrance and exit edges and wherein the vanes are curved and the entry and exit of the brake liquid in the rotor and stator is substantially tangent to the curve of the vanes at their entrance and exit edges.

References Cited in the file of this patent

UNITED STATES PATENTS

| Number | Name | Date |
|---|---|---|
| 1,868,146 | Kiep | July 19, 1932 |
| 1,992,910 | De La Mater | Feb. 26, 1935 |
| 2,164,173 | Durrell et al. | June 27, 1939 |
| 2,189,189 | Bennett | Feb. 6, 1940 |
| 2,206,859 | Duffield | July 2, 1940 |
| 2,218,463 | Bennett | Oct. 15, 1940 |
| 2,251,066 | Persson et al. | July 29, 1941 |
| 2,260,580 | Peterson et al. | Oct. 28, 1941 |
| 2,281,168 | Paget | Apr. 28, 1942 |
| 2,304,721 | Werther | Dec. 8, 1942 |
| 2,351,516 | Jandasek | June 13, 1944 |
| 2,381,187 | Swift | Aug. 7, 1945 |
| 2,410,185 | Schneider et al. | Oct. 29, 1946 |
| 2,429,989 | Buckendale | Nov. 4, 1947 |
| 2,539,004 | Becker | Jan. 23, 1951 |
| 2,598,620 | Swift | May 27, 1952 |